US011061696B2

(12) United States Patent
Seering

(10) Patent No.: US 11,061,696 B2
(45) Date of Patent: Jul. 13, 2021

(54) EXTENSION POINTS FOR WEB-BASED APPLICATIONS AND SERVICES

(71) Applicant: ServiceNow, Inc., Santa Clara, CA (US)

(72) Inventor: Cory Allen Seering, Chicago, IL (US)

(73) Assignee: ServiceNow, Inc., Santa Clara, CA (US)

(*) Notice: Subject to any disclaimer, the term of this patent is extended or adjusted under 35 U.S.C. 154(b) by 81 days.

(21) Appl. No.: 16/253,995

(22) Filed: Jan. 22, 2019

(65) Prior Publication Data
US 2020/0233678 A1 Jul. 23, 2020

(51) Int. Cl.
G06F 9/445 (2018.01)
G06F 8/51 (2018.01)
G06F 9/54 (2006.01)
H04L 12/24 (2006.01)

(52) U.S. Cl.
CPC .......... G06F 9/44526 (2013.01); G06F 8/51 (2013.01); G06F 9/547 (2013.01); H04L 41/04 (2013.01); G06F 2209/549 (2013.01)

(58) Field of Classification Search
None
See application file for complete search history.

(56) References Cited

U.S. PATENT DOCUMENTS

| 6,321,229 B1 | 11/2001 | Goldman |
| 6,678,887 B1 | 1/2004 | Hallman |
| 7,020,706 B2 | 3/2006 | Cates |
| 7,269,833 B2 | 9/2007 | Kushnirskiy |
| 7,716,353 B2 | 5/2010 | Golovinsky |
| 7,769,718 B2 | 8/2010 | Murley |
| 7,925,981 B2 | 4/2011 | Pourheidari |
| 8,151,261 B2 | 4/2012 | Sirota |
| 8,402,127 B2 | 3/2013 | Solin |
| 8,612,408 B2 | 12/2013 | Trinon |
| 8,646,093 B2 | 2/2014 | Myers |

(Continued)

OTHER PUBLICATIONS

ServiceNow Documentation—Extension Points, downloaded from http://docs.servicenow.com, Oct. 29, 2018.

(Continued)

Primary Examiner — Umut Onat
(74) Attorney, Agent, or Firm — Fletcher Yoder PC

(57) ABSTRACT

A web-based application is executable on one or more computing devices, where execution of the web-based application involves invocation of at least one extension point. The one or more computing devices are configured to: (i) receive, by the web-based application and from a client device, a request for web-based content; (ii) receive, by an extension point service, a call to a particular extension point, where the particular extension point is related to the web-based content, (iii) request and receive, by the extension point service and in communication with a database, one or more implementations corresponding to the particular extension point, and (iv) transmit, by the extension point service and in response to the call to the particular extension point, one or more user-defined plugin scripts included in the one or more implementations, output from which is incorporated in the web-based content as displayed by the client device.

20 Claims, 16 Drawing Sheets

(56) References Cited

U.S. PATENT DOCUMENTS

| | | | |
|---|---|---|---|
| 8,762,934 B2* | 6/2014 | Sarafudinov | G06F 8/35 |
| | | | 717/104 |
| 8,793,568 B2* | 7/2014 | Aman | G06F 8/38 |
| | | | 715/227 |
| 8,832,652 B2 | 9/2014 | Mueller | |
| 8,983,982 B2 | 3/2015 | Rangarajan | |
| 9,065,673 B2 | 6/2015 | Diab et al. | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,697,009 B2* | 7/2017 | Ben-Itzhak | G06F 9/4406 |
| 9,766,935 B2 | 9/2017 | Kelkar | |
| 9,805,322 B2 | 10/2017 | Kelkar | |
| 9,811,393 B2 | 11/2017 | Kiehtreiber et al. | |
| 2002/0111972 A1* | 8/2002 | Lynch | G06F 9/4451 |
| | | | 715/236 |
| 2005/0010898 A1* | 1/2005 | Ogawa | G06F 8/30 |
| | | | 717/106 |
| 2006/0236254 A1* | 10/2006 | Mateescu | G06F 8/75 |
| | | | 715/762 |
| 2010/0005476 A1* | 1/2010 | Jayet | G06F 9/4415 |
| | | | 719/311 |
| 2010/0131838 A1* | 5/2010 | Palmieri | G06F 16/986 |
| | | | 715/234 |
| 2012/0221709 A1* | 8/2012 | Bowes | G06Q 30/0257 |
| | | | 709/224 |
| 2015/0082275 A1* | 3/2015 | Aman | G06F 8/34 |
| | | | 717/109 |
| 2017/0060650 A1* | 3/2017 | Anderson | G06F 9/547 |
| 2017/0168783 A1* | 6/2017 | Liu | G06F 8/34 |

OTHER PUBLICATIONS

TechNow Episode 1 | ServiceNow Jelly Scripting Part 1 of 3, Youtube, https://www.youtube.com/watch?v=_MhWugMQegs, Feb. 1, 2013.

Jelly Tags, downloaded from https://docs.servicenow.com/bundle/london-application-development/page/script/general-scripting/reference/r_JellyTags.html, Jan. 18, 2019.

* cited by examiner

```
900 ─→
<html>
  <head>
    <meta charset="utf-8">
902 ─→ <title>Welcome ${user.name} to Jelly </title>
  </head>
  <body>
904 ─→ <g: call_extension name="Foo"
         id="${current.id}" description="${current.description}" limit="1"/>
    <h2> Hello World! </h2>
  </body>
</html>
```

FIG. 9

EXTENSION POINTS FOR WEB-BASED APPLICATIONS AND SERVICES

BACKGROUND

A remote network management platform may support the creation of custom applications for enterprise users. These custom applications can range from simple web forms to workflow management and other productivity tools. To support rapid development of such applications, the remote network management platform may support its own set of common application programming interfaces and components. For example, these components may include a standardized set of widgets for graphical user interface (GUI) development.

SUMMARY

While using the common interfaces and components provided by a remote network management platform can speed development and testing of custom applications, drawbacks also exist. In some scenarios, an enterprise may modify or build upon these interfaces and components in order to suit its own needs.

As one possible example, the common interfaces may provide a set of operations that can be used to access enterprise employee information in a database. Some of this information could be sensitive, such as home addresses, phone numbers, social security numbers, and so on of employees. Thus, the enterprise may modify these platform-provided operations to check the permissions of the person or program attempting to access the sensitive information. For example, this check may require entry of a userid and password of a senior executive or an HR manager in order for the sensitive information to be retrieved. Other customizations are possible.

Additionally, any of these customizations or changes to the platform-provided operations, of which there may be many in a typical enterprise that uses the remote network management platform, becomes problematic when the platform is upgraded. Such an upgrade may overwrite the customizations, change the interfaces used by the customizations, or require that the customizations be refactored in some fashion. As a result, the enterprise either has to undertake some effort to make its customizations work properly on the upgraded platform, or refrain from installing part or all of the upgrade. The latter approach can cause long term difficulties especially as platform upgrades often fix security problems and other defects in the platform.

The embodiments herein provide a flexible mechanism for supporting user-defined plugins on a remote network management platform. The platform code defines extension points, or places in the code where one or more plugins can be referenced. The enterprise may define these plugins and store them separately from the platform code. Then, during operation, invocation of an extension point call will cause the associated plugin(s) to be executed. In this way, custom operations can be supported and the plugins will not be overwritten during platform upgrades. The embodiments herein are flexible, and can be used with server-side scripts, client-side scripts, and XML-based scripting languages, for example.

Accordingly, a first example embodiment may involve a computational instance of a remote network management platform, where the computational instance is associated with a managed network. The computational instance may include a database containing at least one implementation related to extension points defined in source code scripts, where the at least one implementation includes at least one user-defined plugin script. The computational instance may also include an extension point service that is executable on one or more computing devices disposed within the computational instance, where the extension point service is configured to map between extension points and corresponding implementations. The computational instance may also include a web-based application that is executable on the one or more computing devices, where execution of the web-based application involves invocation of at least one of the extension points. The one or more computing devices may be configured to: (i) receive, by the web-based application and from a client device associated with the managed network, a request for web-based content; (ii) receive, by the extension point service, a call to a particular extension point, where the particular extension point is related to the web-based content; (iii) request and receive, by the extension point service and in communication with the database, one or more implementations corresponding to the particular extension point; and (iv) transmit, by the extension point service and in response to the call to the particular extension point, one or more user-defined plugin scripts included in the one or more implementations, where output from execution of the one or more user-defined plugin scripts is incorporated in the web-based content as displayed by the client device.

A second example embodiment may involve receiving, by a web-based application and from a client device associated with a managed network, a request for web-based content, where the web-based application is executable on one or more computing devices disposed within a computational instance of a remote network management platform, where the computational instance is associated with the managed network, where a database disposed within the computational instance contains at least one implementation related to extension points defined in source code scripts, and where the at least one implementation includes at least one user-defined plugin script. The second example embodiment may also involve receiving, by an extension point service that is executable on the one or more computing devices, a call to a particular extension point, where the particular extension point is related to the web-based content, and where the extension point service is configured to map between extension points and corresponding implementations. The second example embodiment may also involve requesting and receiving, by the extension point service and in communication with the database, one or more implementations corresponding to the particular extension point. The second example embodiment may also involve transmitting, by the extension point service and in response to the call to the particular extension point, one or more user-defined plugin scripts included in the one or more implementations, where output from execution of the one or more user-defined plugin scripts is incorporated in the web-based content as displayed by the client device.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 depicts an example Jelly page, in accordance with example embodiments.

DETAILED DESCRIPTION

Figure 1:
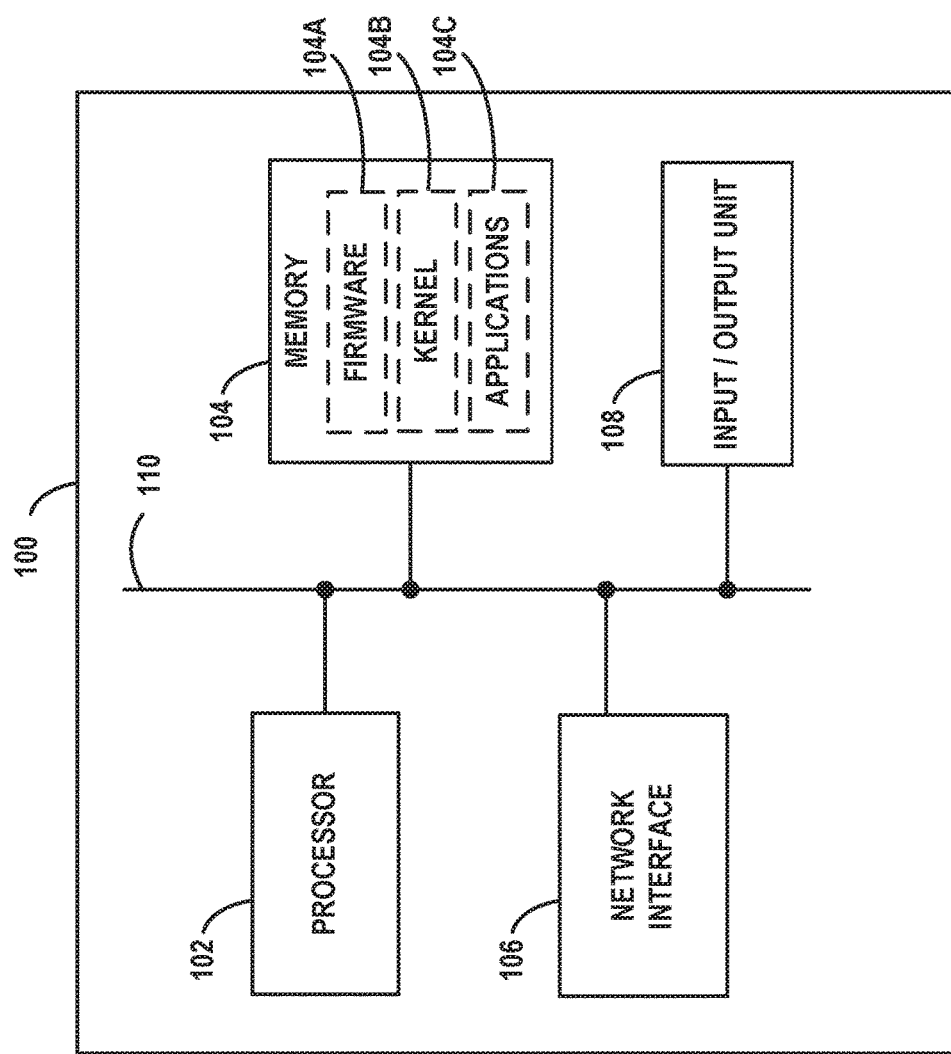
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/ output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
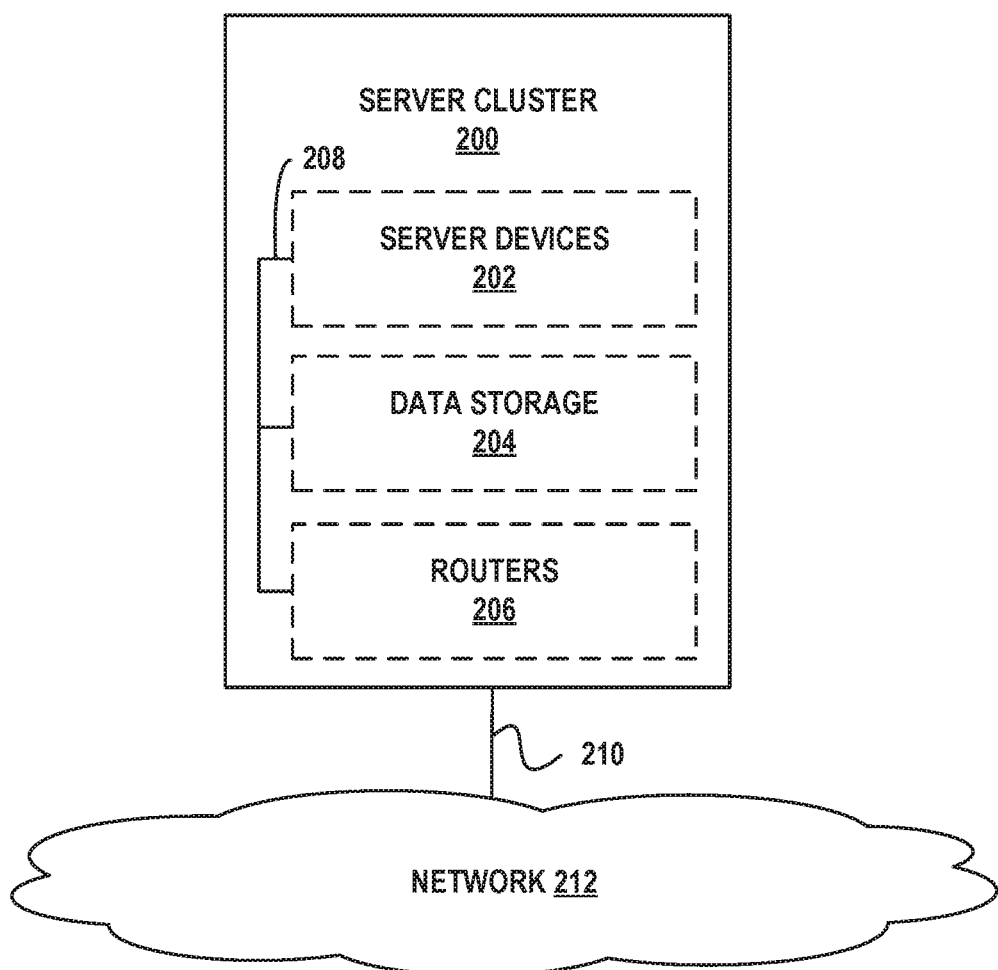
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
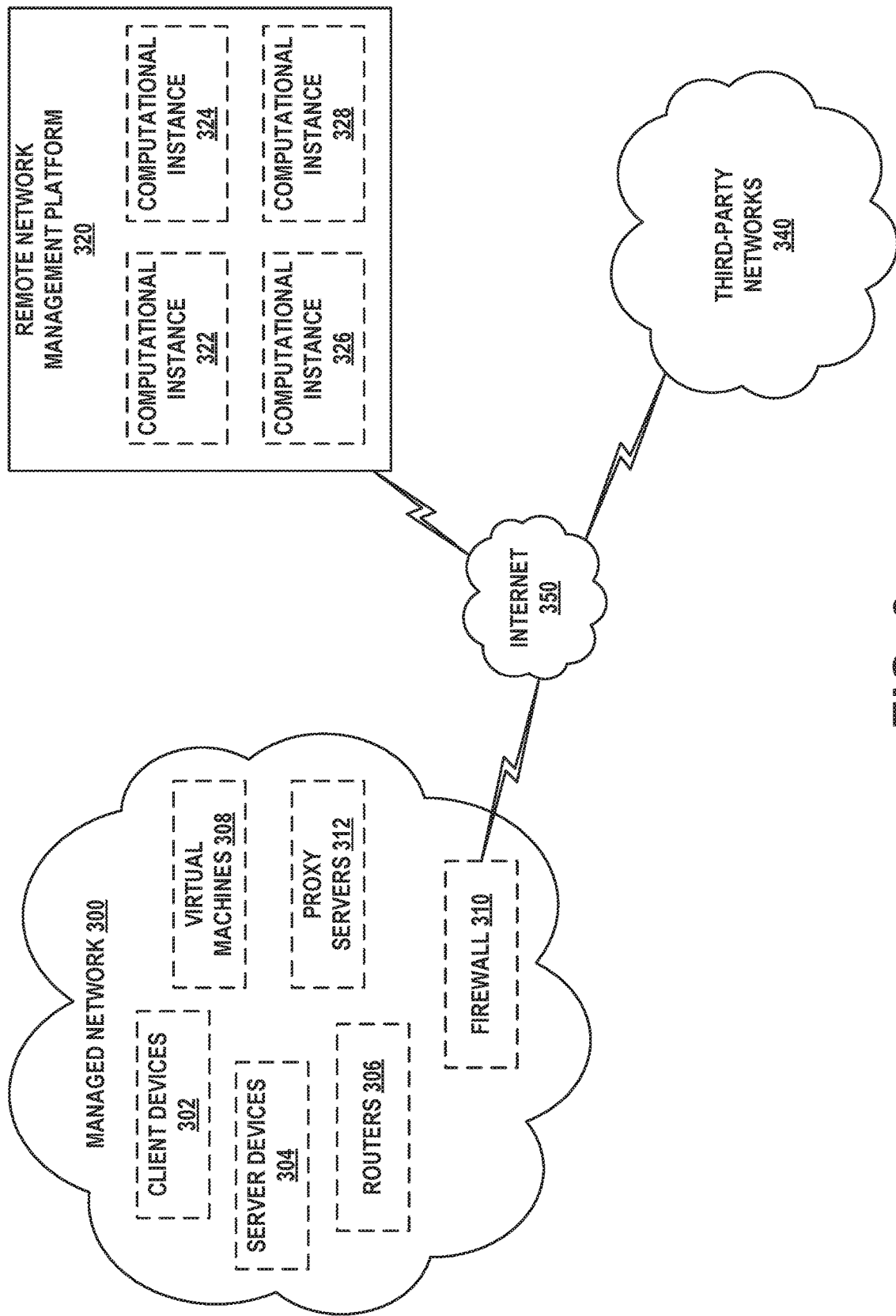
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
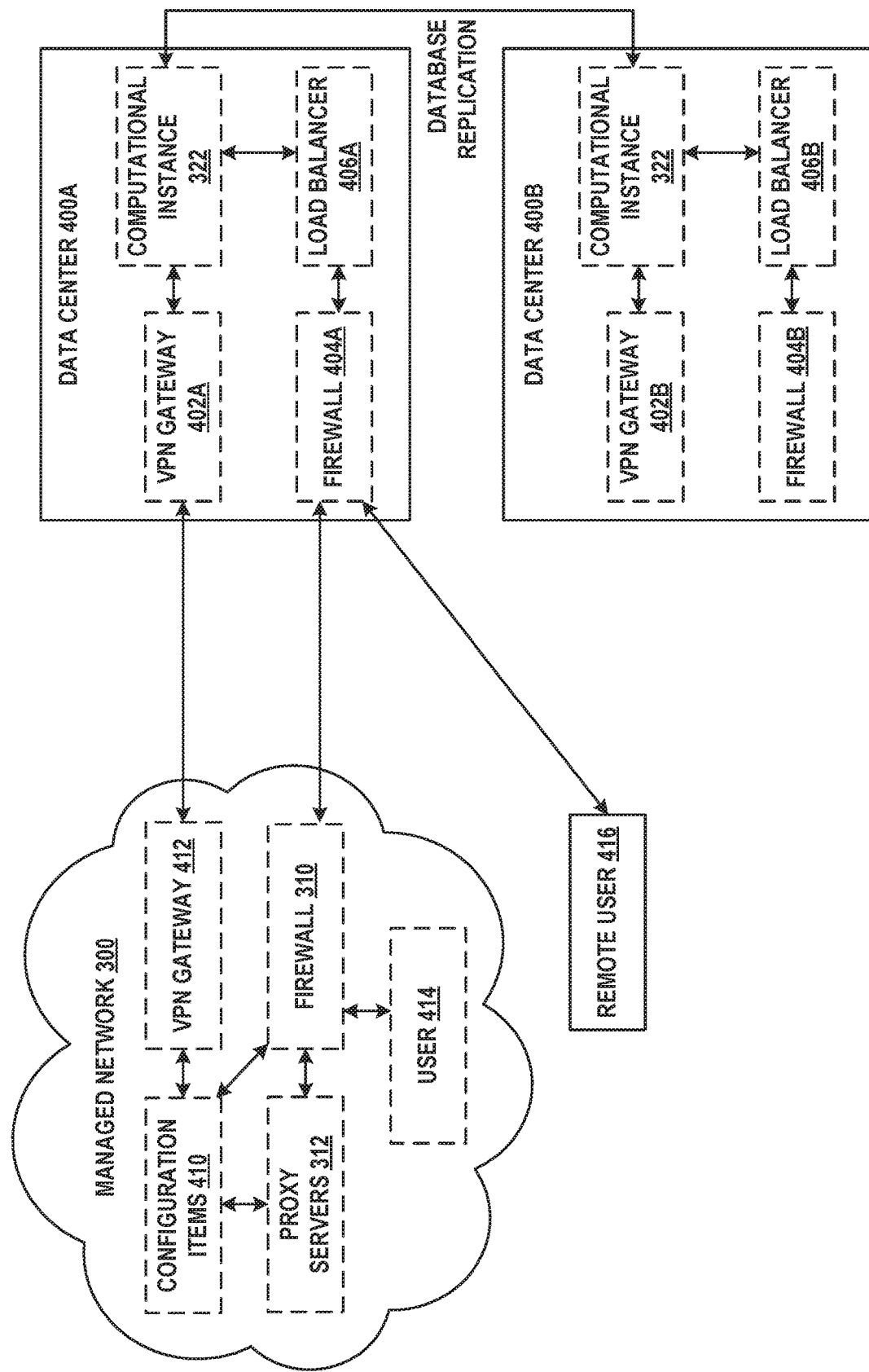
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
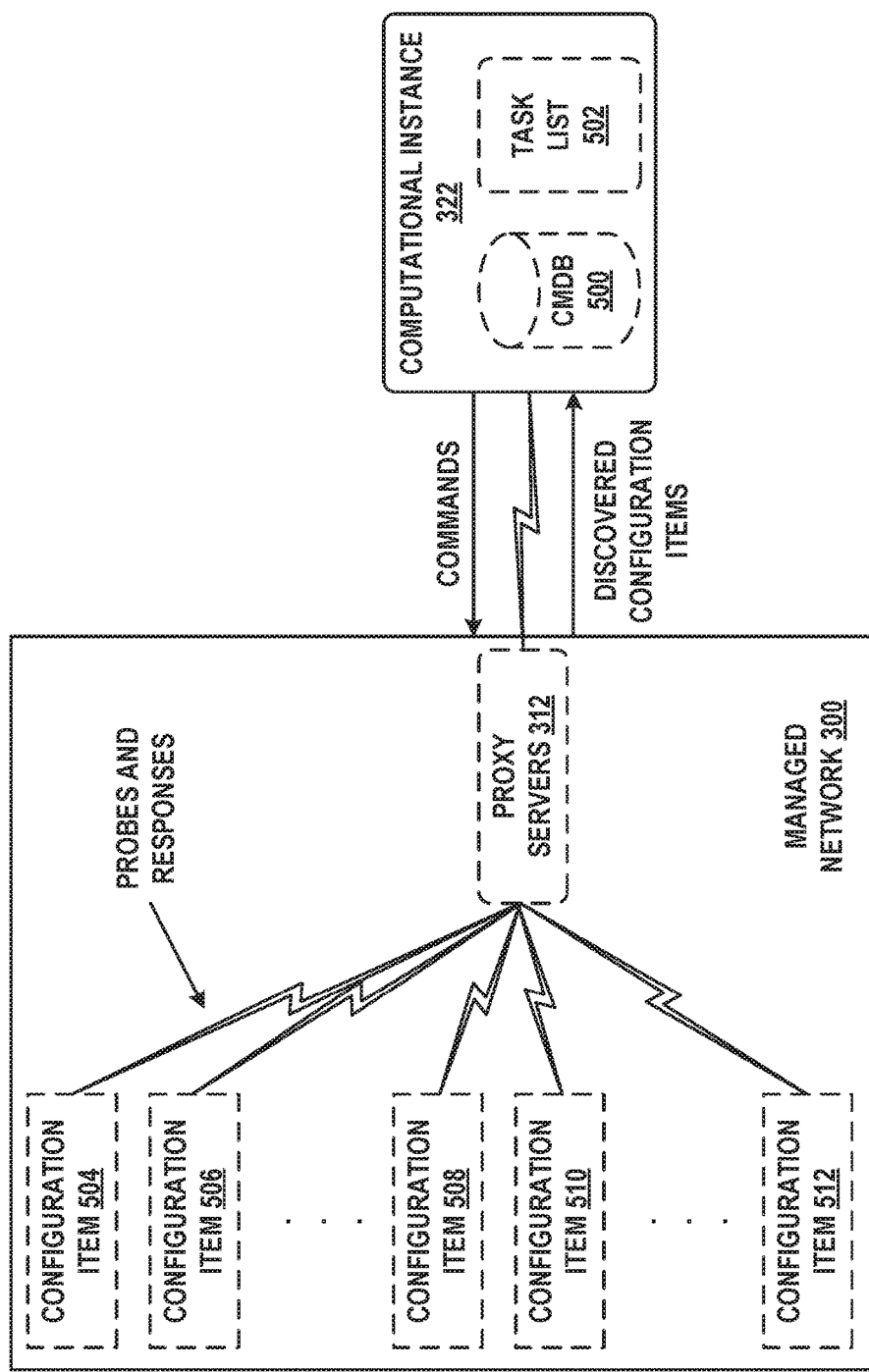
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
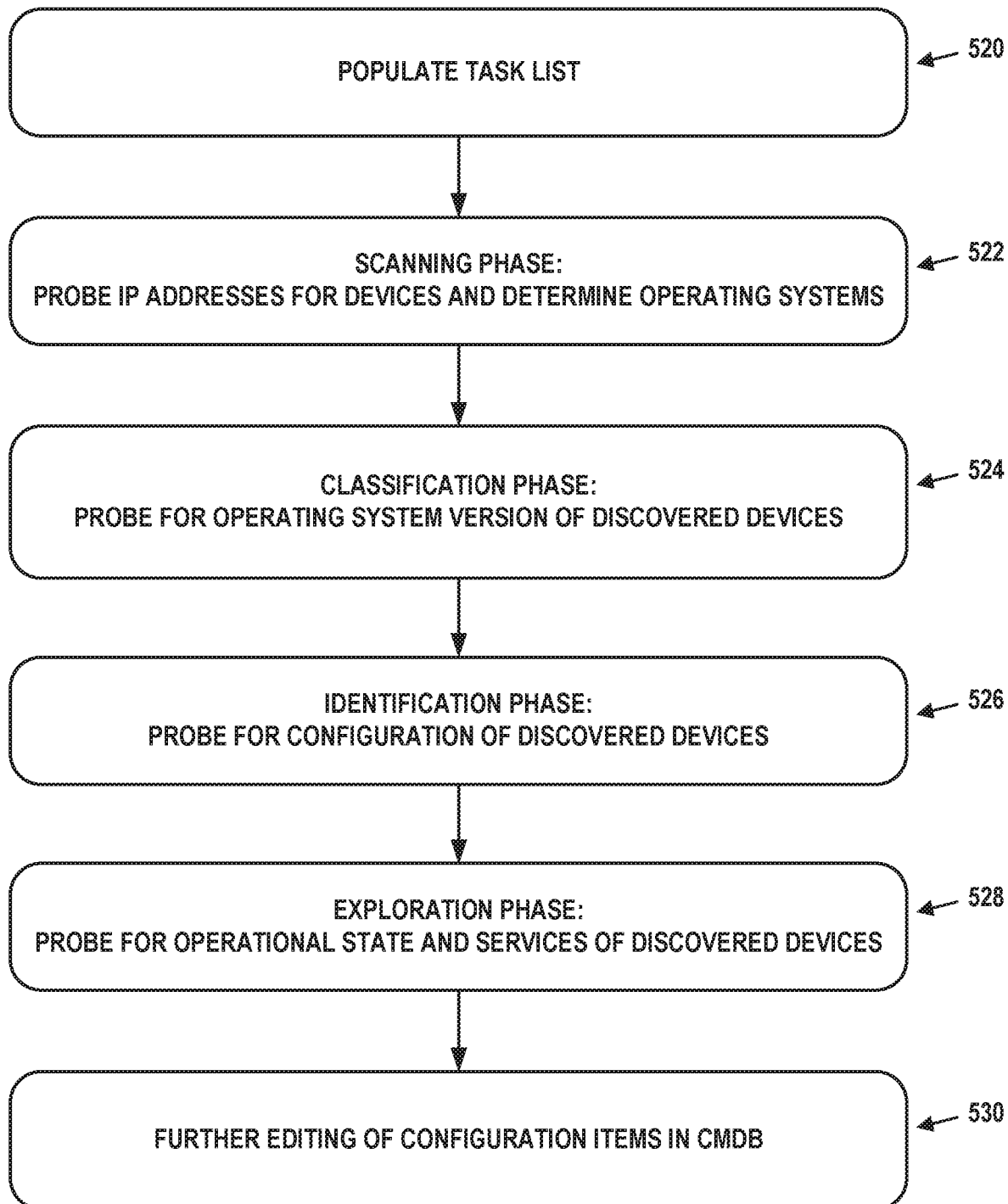
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Managing Data Access and Upgrade Dependency

As noted previously, remote network management platform 320 may provide the ability for application developers of managed network 300 to create custom applications remotely hosted on one or more computational instances. Custom applications can range from simple spreadsheets to custom-built software tools. These applications may be accessed by users within managed network 300 or third party users (e.g., via public URLs). To reduce time-consuming, repetitive application development tasks, remote network management platform 320 may support standardized application components, such as a standardized set of widgets for graphical user interface (GUI) development.

During development or execution, custom applications may be configured to utilize sensitive information discovered on managed network 300 or entered by users of managed network 300. For example, a custom analytics application may be configured to arrange graphical representations of sensitive financial information. As a result, such an application may inadvertently provide application developers or users of the application with complete access to the sensitive financial information of the enterprise. To prevent sensitive information from disseminating, an enterprise may be interested in restricting access to the sensitive information hosted on the computational instance by using data access roles.

In data management, a data access role is a set of permissions that can be assigned to users within an enterprise. Each role is restricted to the operations allocated to that specific role by an administrator. Thus, the management of user access to data becomes a matter of allocating the appropriate roles to users. This simplifies common operations, such as adding new users or changing the department of a current user.

A computational instance may be configured with data access roles to facilitate access management. For example, a computational instance may include roles for HR, supply chain, IT, and finance. Each role may limit access to records of a specific department associated with the role. This can prevent sensitive data (e.g., payroll data or revenue data) from being accessed by all users within an enterprise. To ensure that permissions are assigned appropriately, data access roles might only be created/assigned/removed by upper level administrators.

Data access roles may have disadvantages as well. For example, an application developer creating a custom application on a computational instance may not have direct access to the database tables of a particular department. Since application developers are not able to assign themselves new roles, they may have to request access from an upper level administrator. This request may take days or weeks to be approved or may not be approved at all. This can be problematic if the application developer needs to fix an error in the application.

To address this problem, an organization may decide to cross train employees to permit multiple roles. For example, HR staff may be trained with IT skills, thus enabling them to directly address problems on custom HR applications. Or application developers and system administrators may be trained with HR skills, enabling them to work on these custom HR applications. These approaches are expensive in both the cost and time of training, and are unrealistic for organizations with various specialized departments.

Furthermore, creating custom applications on a computational instance may involve customizing out-of-the-box application features provided by the entity operating remote network management platform 320. For example, an application developer may require new functions, additional database tables, or different sets of naming conventions. Consequently, any modifications made by the entity operating remote network management platform 320 to the same computational instance may conflict with these customizations. For example, the entity operating remote network management platform 320 may release new software upgrades periodically (e.g., every three months, six months, etc.). Such software upgrades may include new GUI widgets for application development, new scripts, new database tables and schemas, bug fixes, or updated security protocols. To enable such an upgrade, the entity operating remote network management platform 320 may overwrite some or all of the existing application code and data on the computational instance. This may include the custom application features.

To prevent users from losing custom application features during upgrades, remote network management platform 320 may be configured to offer users a choice on whether to accept the software upgrade or retain an old software version on a computational instance. However, retaining old software versions may involve the entity operating remote network management platform 320 supporting old software features rather than creating new software features.

In order to address the complications of data access and upgrades, remote network management platform 320 may be configured with an extension point system. Such an extension point system may facilitate software plugins, allowing application developers to customize the functionality of an application without editing the original code. These plugins may be referenced at designated places, referred to as extension points, where implementations of the custom code can be called by the application. Such implementations may denote one or more scripts/UI macros external to the application that execute custom functionality. Thus, implementations may be referred to as "user-defined plugin scripts" herein, though some implementations may contain or use mechanisms other than such scripts.

Figure 6:
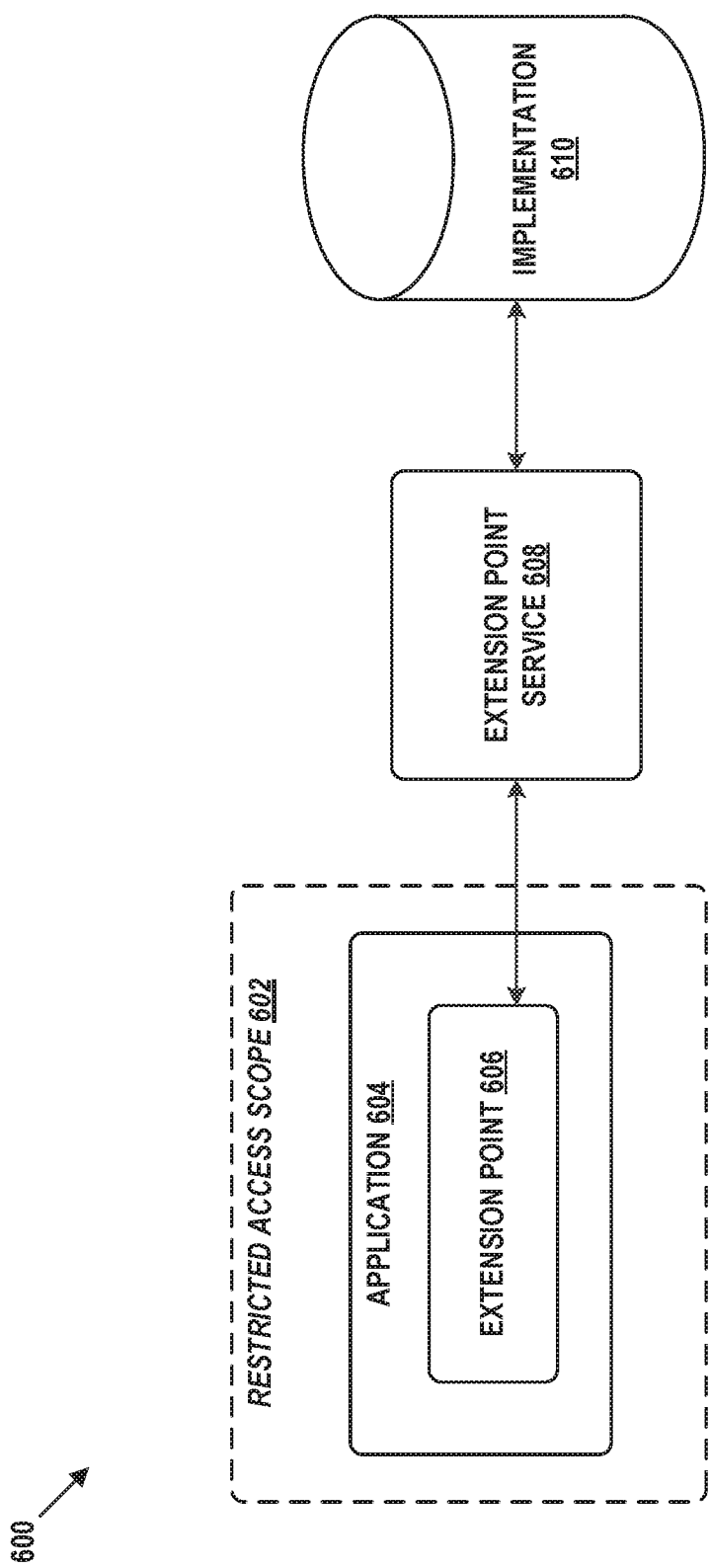
FIG. 6 depicts an extension point architecture, in accordance with example embodiments.

FIG. 6 illustrates an extension point system 600 that may be contained within a computational instance of remote network management platform 320. In example embodiments, extension point system 600 may include restricted access scope 602. As discussed above, access to applications within restricted access scope 602, for example application 604, may be limited to users with appropriate data access roles. To allow application developers without appropriate data access roles to add custom functionality, application 604 may include extension point 606. Extension point 606 may be embedded into the code of application 604 and may be configured to make requests to extension point service 608 for custom scripts/UI macros.

Extension point service 608 may be configured to receive requests for custom scripts/UI macros from extension point 606, retrieve the associated implementations from implementation storage 610, and return the implementations and/or the executed results of the implementations back to extension point 606. In some embodiments, extension point system 600 may be configured to allow extension point 606 to access custom scripts/UI macros from extension point service 608, but restrict extension point service 608 from accessing data on application 604. This type of data access may be referred to as one-way access.

Implementation storage 610 may include one or more databases or storage devices arranged to store one or more scripts/UI macros that implement extension point 606. Since access to implementation storage 610 is not within restricted access scope 602, application developers may add or edit these implementations to provide customize features on application 604. Each extension point may be associated with one or more implementations, some of all of which may be returned for execution or use when such an extension point is invoked.

The arrangement of extension point system 600 may allow application developers with restricted access roles to provide features and/or bug fixes to an application. For example, an extension point may be provided through which an application developer can write an implementation. The implementation may run an authentication check on text input and return a Boolean value specifying whether the check succeeded. In practice, this extension point may pass the text input to an external implementation retrieved from implementation storage 610. This implementation may run the authentication check and return the results. The application may use the returned result to decide on subsequent actions. This may include, for example, asking the user for a second text input.

As such, extension point system 600 defines a structure for integrating external scripts/UI macros (i.e. implementations) into an application. Extension point system 600 may limit or prevent software upgrades from overwriting custom code embedded into application base code by externalizing custom application features. Additionally, extension point system 600 may limit or prevent access control complications by externalizing access to custom application features away from the application itself.

A. Example Extension Point Graphical User Interface

To enable an extension point system, remote network management platform 320 may prompt application developers of managed network 300 to enter the appropriate configuration information for individual extension points. This may be accomplished by way of a web page, a series of web pages, or other web-based content hosted by a computational instance associated with managed network 300 and provided to an application developer upon request.

Figure 7A:
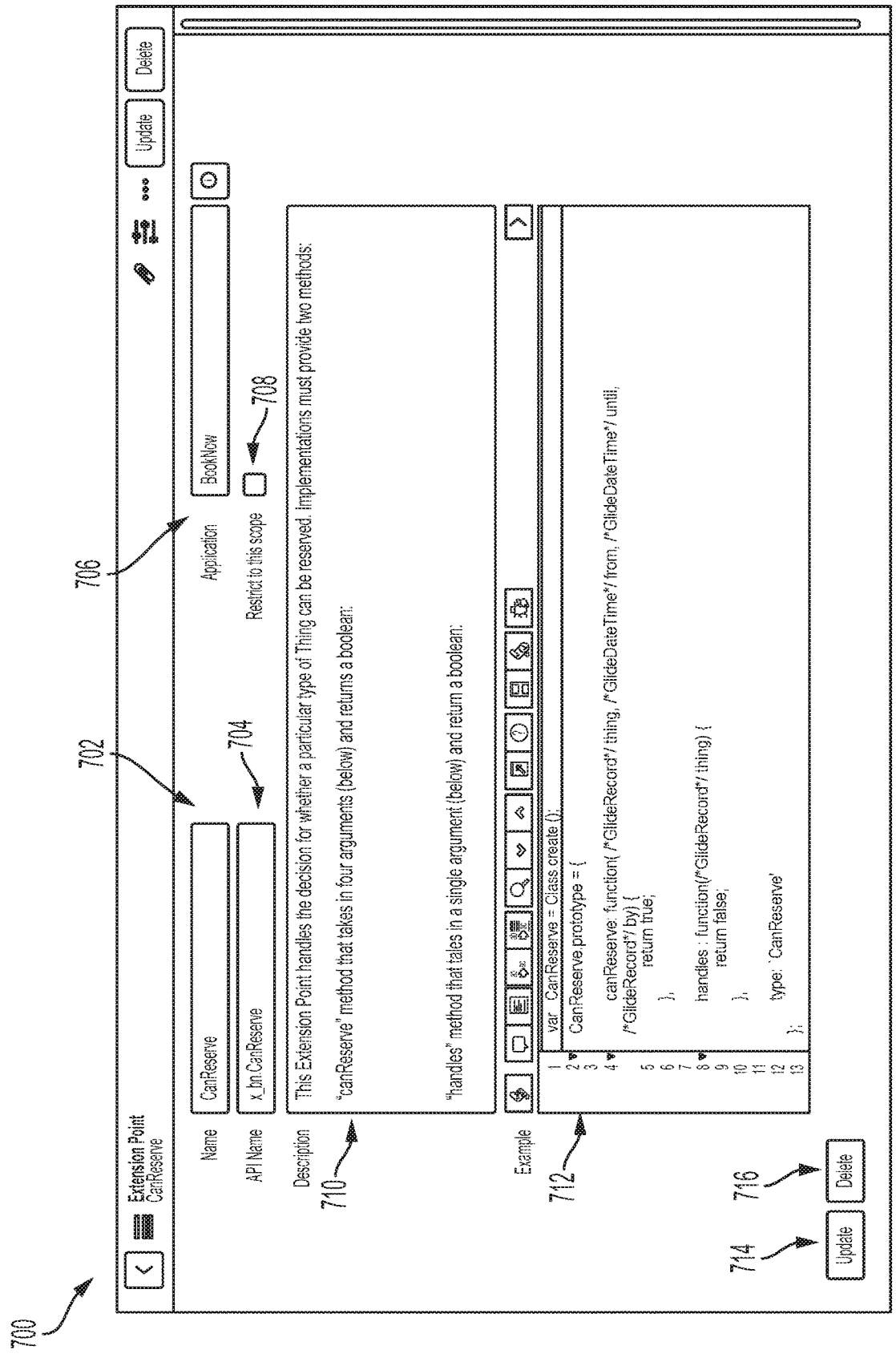
FIG. 7A depicts an example extension point configuration, in accordance with example embodiments.

FIG. 7A depicts such a web page 700. This web page facilitates the configuration of an extension point through the use of input fields. Configuring an extension point using web page 700 may be referred to as defining an extension point or creating an extension point definition.

Web page 700 may contain several configuration details. For example, name field 702 may allow application developers to assign a unique name to an extension point in order to request implementations or executed implementations of that specific extension point. Additionally, application program interface (API) name field 704 may allow application developers to assign a unique API name to an extension point. This API name may be used as part of a representational state transfer (REST) API request to access implementations or executed implementations of the extension point, as further discussed below.

In some embodiments, the name field 702 may be configured to automatically add a default prefix to distinguish similar extension point names. For example, two extension points on managed network 300 may be named "foo_bar". Thus, to distinguish between the two extension points, a prefix based on application context may be added, for instance "application_A_foo_bar" and "application_B_foo_bar".

Application scope field 706 may allow application developers to designate an application scope for an extension point. This application scope may be used to restrict implementations of the extension point to only accessing data or variables in scope of the designated application. Scope restriction 708 (shown as a selectable checkbox) may prevent implementations created by other application scopes from running when the extension point is invoked. This allows applications to define and utilize a new extension point while preventing other applications (i.e., applications outside of the application scope) from adding implementations to the new extension point.

Description 710 may provide application developers with details on how custom scripts/UI macros that implement the extension point are to be structured. Description 710 may include a high level description of the extension point, a list of methods the implementations should include, a list of input variables that may be passed to the implementations, and how the output of the implementations should be formatted.

Example field 712 may provide an example implementation to assist application developers in easily creating a custom script/UI macro to implement the extension point. For instance, an application developer may use the implementation in example field 712 as a template for creating one or more custom scripts/UI macros that implement the extension point.

Update button 714 would typically be pressed, clicked on, or otherwise activated when the application developer is satisfied with the extension point definition as shown on web page 700. Alternatively, delete button 716 may be pressed, clicked on, or otherwise activated when the application developer wants to remove the extension point definition from the computational instance.

In some embodiments, the entity operating the remote network management platform 320 may predefine one or more extension points as shown in web page 700 by identifying out-of-the-box components that are frequently customized by application developers. For example, based on user feedback, the entity may discover that application developers create custom security checks for users logging into their application. Thus, the entity may predefine a security extension point that can be called during application login.

In some embodiments, application developers may define one or more custom extension points that execute on top of out-of-the-box components. For example, the entity operating the remote network management platform 320 may provide an out-of-the-box UI page that resets a password. This page may include a dialog box to allow users to change a password by asking for a link to be sent to an e-mail address. Accordingly, an application developer may create a custom extension point, embedded into the UI page, which allows additional password reset methods, such as SMS messages sent to a phone or push notifications to a mobile app.

In scenarios in which the entity operating remote network management platform 320 updates the UI page, the application developer may either retain version of the UI page embedded with the custom extension point or may choose to replace the UI page with an updated UI page. Notably, even if the UI page is replaced, the application developer may then embed the custom extension point into the updated UI page to re-add all of customizations.

Once an extension point is defined, an application developer may begin creating scripts/UI macros that implement the extension point. This may be accomplished by way of a web page, a series of web pages, or other web-based content hosted by a computational instance associated with managed network 300 and provided to an application developer upon request. Each implementation may adhere to the extension point definition from web page 700 and may utilize the templates provided by example field 712. Implementations may then be stored on a database in the computational instance for later use by the application developer and for execution by the computational instance. After implementations of the extension point are created, the extension point may be used by an application developer in an application.

In some embodiments, application developers may utilize extension points defined by other application developers on remote network management platform 320. For example, application scope field 706 may be configured with an option to allow an extension point to be utilized by other developers.

Figure 7B:
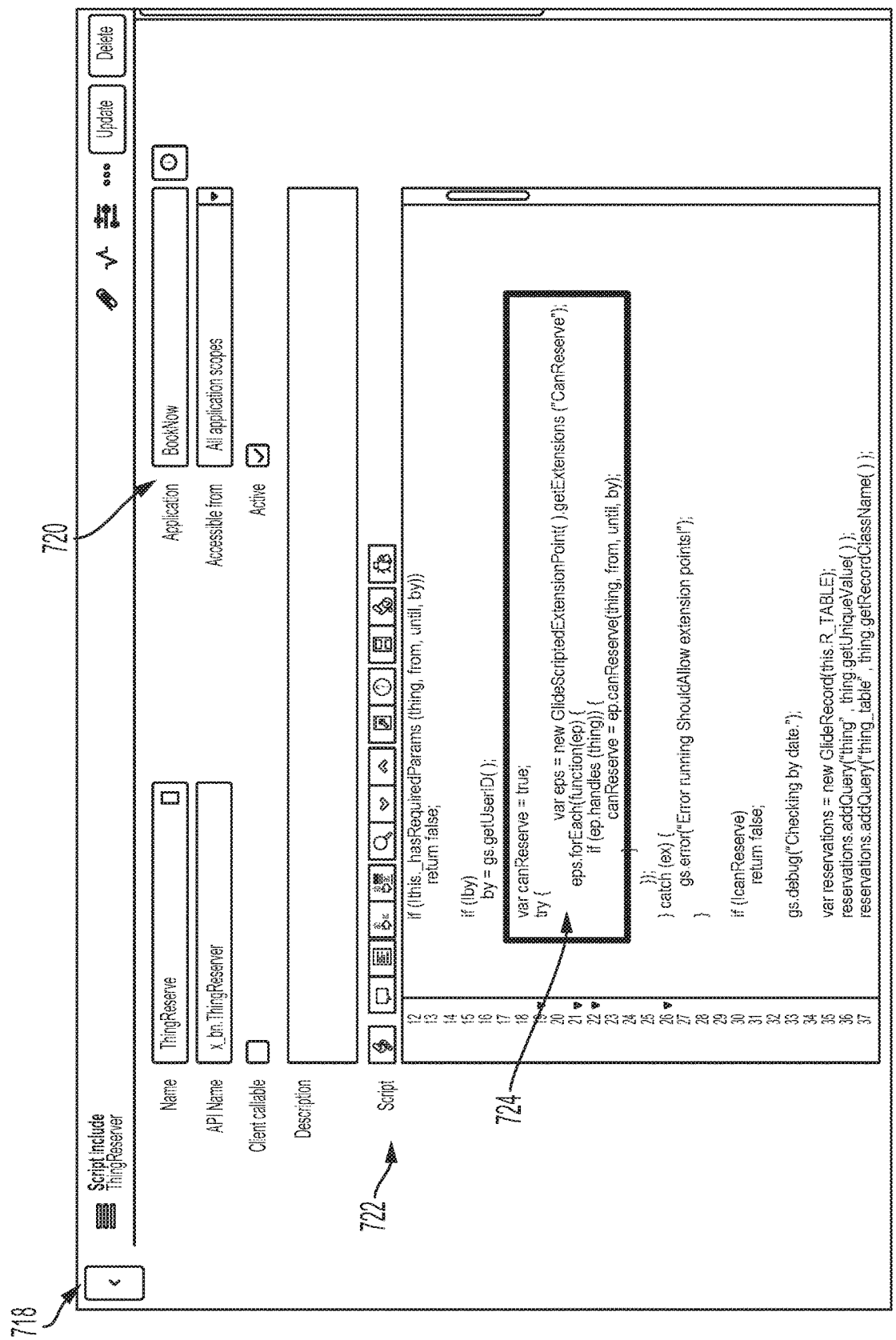
FIG. 7B depicts an extension point used by an application, in accordance with example embodiments.

FIG. 7B illustrates how an extension point may be used by an application. For example, FIG. 7B includes application interface 718 that facilitates the development of applications remotely hosted on a computational instance. As such, application interface 718 may include scope field 720 for scoping the application, script editor 722 for coding the application, and extension point call 724.

Scope field 720 may allow application developers to assign an application scope that allows an application to request extension point implementations. As an example, given that scope field 720 and application scope field 706 are assigned to the same scope and scope restriction 708 is turned on, applications created from application interface 718 may utilize extension points defined via web page 700, but may be limited to accessing extension points implementations made within the same application scope. Alternatively, if scope restriction 708 is turned off, applications created from application interface 718 may utilize extension points defined via web page 700 and may access extension point implementations created by applications outside of the application scope (e.g., implementations created by a separate application).

Script editor 722 may allow an application developer to directly edit the code defining the application. By default, script editor 722 may contain out-of-the-box application code provided by the entity operating remote network management platform 320. As discussed previously, it may be beneficial for an application developer to not edit these out-of-box scripts. Rather, an application developer may utilize extension point 724 by passing in the name of a defined extension point. Extension point 724 may then receive the executed results of one or more implementations of the defined extension point. The script may then utilize the received results to execute subsequent logic in the application code. In FIG. 7B, the object eps invokes an extension point and then executes the returned implementations.

Notably, the graphical user interfaces of FIG. 7A and FIG. 7B are just examples of how such interfaces can be arranged. Other arrangements are possible.

B. Example Extension Point Architecture

Figure 8:
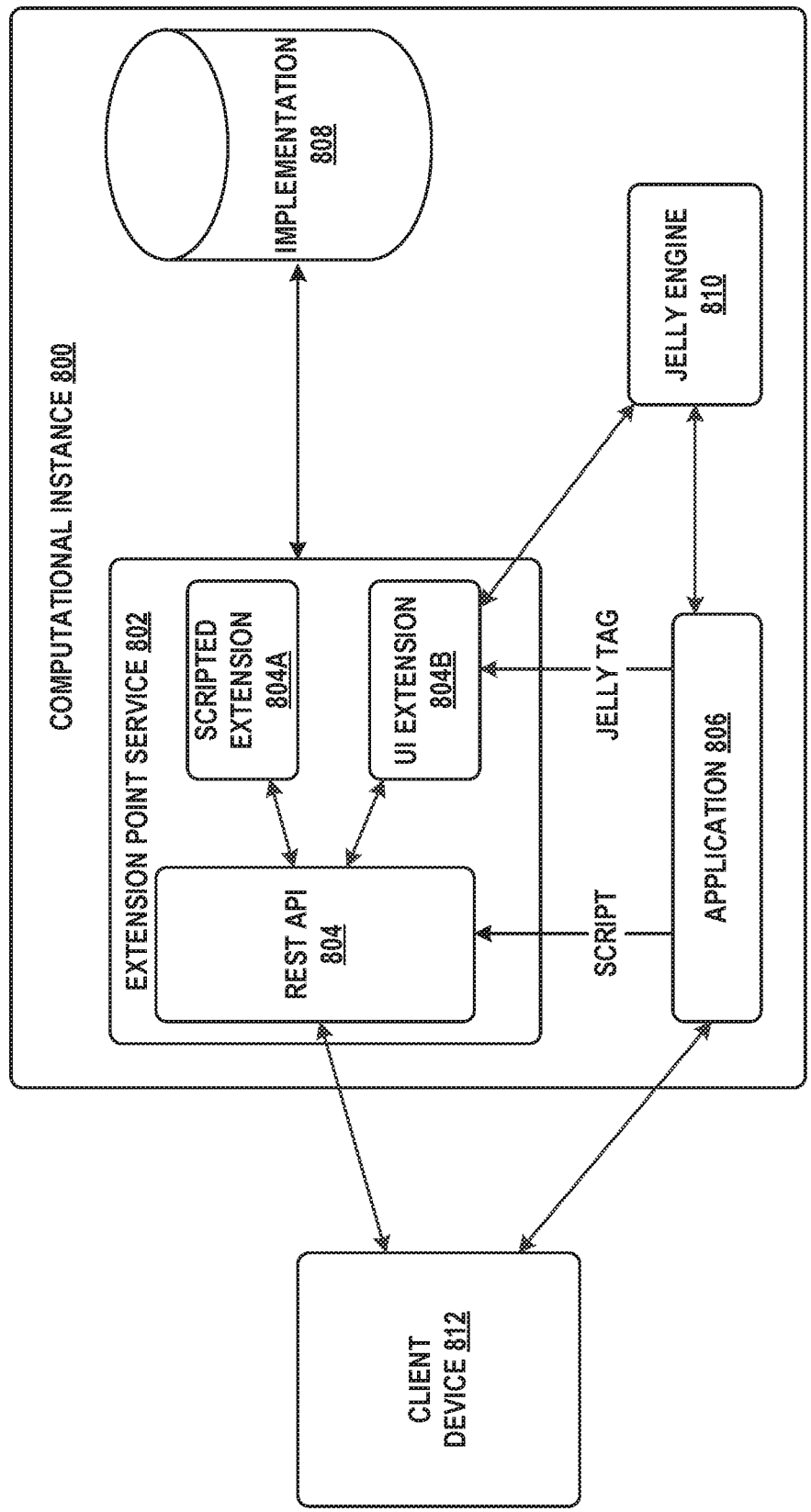
FIG. 8 depicts a logical arrangement of components for an extension point system, in accordance with example embodiments.

FIG. 8 depicts a logical arrangement of software modules and/or computing devices for an extension point system in computational instance 800 of remote network management platform 320. Computational instance 800 may be one of several computational instances used by managed network 300. Example computational instance 800 contains extension point service 802 (which includes REST API 804, scripted extension 804A, and UI extension 804B), application 806, implementation database 808, and Jelly engine 810. Notably, components of FIG. 8 may be embodied by components described in FIG. 6. For instance, extension point service 802 may be embodied by extension point service 608, application 806 may be embodied by application 604, and implementation database 808 may be embodied by implementation storage 610. FIG. 8 also contains client device 812, which might not be part of computational instance 800, but may interact with REST API 804 and application 806 as described below.

Extension point service 802 may include one or more software modules or computing devices configured to receive requests for extension point implementations, retrieve the implementations, and return the implementations or executed implementations. For example, extension point service 802 may facilitate interactions between extension points on application 806 or client device 812 and implementation database 808. In some embodiments, extension point service 802 may be configured to cache extension point implementations that are frequently requested by application 806 or client device 812. This may save time, as extension point service 802 may not have to continuously retrieve identical implementations from implementation database 808.

Extension point service 802 may include REST API 804 to facilitate requests for extension point implementations from application 806 or client device 812. Through REST API 804, application 806 and client device 812 may engage in Hypertext Transfer Protocol (HTTP) communication with extension point service 802. The act of requesting access to resources of extension point service 802 may be referred to as a REST API call. This may involve the application 806 or client device 812 transmitting a request for an extension point implementation to REST API 804 in the form of a URL or other string identifying the web-based resource (i.e. API name field 704).

Scripted extension 804A and UI extension 804B may include one or more data structures with methods, functions and/or variables to facilitate retrieving and executing extension point implementations. Upon receipt of the request, REST API 804 may interpret the request as a request for scripted extension 804A, which may be implemented by scripts, or UI extension 804B, which may be implemented by UI macros. In either case, REST API 804, by way of scripted extension 804A or UI extension 804B, may retrieve the associated extension point implementations from implementation database 808 and return the implementations or executed implementations to application 806 or client device 812. In some embodiments, implementation database 808 may be configured to return all implementations of the extension point as a list, with options to limit the number of implementations returned in the list and to arrange the ordering of implementations in the list.

Application 806 may include one or more custom applications created by an application developer (e.g., via application interface 718). These applications may include web-based applications that interact with client device 812 via HTTP requests. Application 806 may be written in Jelly (an XML-based scripting and processing engine), HTML, scripts (e.g., JavaScript), or a combination thereof. Alternatively and/or additionally, application 806 may be written in scripting languages or templates associated with alternative rendering engines, as further described below.

Implementation database 808 may include one or more scripts/UI macros that implement one or more extension points. For example, implementation database 808 may contain a database table for each extension point with each row of the table containing an implementation. Access to implementation database 808 may be separate from access to application 806 (which may use a different database to store application data). This may allow application developers without access rights to application 806 to modify the implementations on implementation database 808. In some embodiments, implementation database 808 may store indicator flags associated with each implementation. When receiving a request for implementations from extension point service 802, implementation database 808 may be configured to only return implementations with indicator flags set to true.

Jelly engine 810 may include one or more processors for rendering Jelly. Jelly engine 810 may turn Jelly into executable code, run the executable code, and return results. For example, Jelly engine 810 may take Jelly from application 806 as input and return rendered HTML. Alternatively, instead of Jelly engine 810, other rendering engines that allow mixing of server-side logic/data with XML tags may be used. For example, a PHP rendering engine may be used, which may allow an extension point system to make use of implementations written in PHP. Alternative rendering engines may take input from application 806/extension point service 802 and return rendered HTML Client device 812 may include one or more client devices that use application 806 and may make requests to REST API 804. These client devices may be devices on managed network 300 or may be third party clients.

C. Jelly

As described above, Jelly is a XML-based scripting and processing engine for turning XML into executable code. By using XML tags rather than traditional coding constructs (e.g., variable types, loops, and if-else statements), application developers with little programming experience can create UI macros or Jelly pages for custom applications. Herein, Jelly and similar mechanisms may be referred to as "rendering engines", which may allow mixing of server-side logic/data with XML tags and may convert XML-based script directives into markup language or elements of a markup language.

FIG. 9 depicts an example Jelly page 900. Jelly page 900 may include a mixture of common HTML tags (e.g., <head>, <body>), as well as Jelly expression 902 and Jelly tag 904. Jelly page 900 may be created by an application developer as part of application 806. Upon a request from client device 812, the contents of Jelly page 900 may be rendered via Jelly engine 810. During rendering, Jelly engine 810 may identify each Jelly expression and/or tag in Jelly page 900 and associate each expression and/or tag with a set of known operations. For example, Jelly engine 810 may identify Jelly tag 904 and call a predefined function to handle the operations involving the identified tag. After rendering, the output of Jelly engine 810 may be delivered to client device 812.

Jelly expression 902 may include variables that can be rendered by Jelly engine 810. An application developer may use Jelly expression 902 to customize content on application 806. For example, Jelly expression 902 may be configured to render the username of any user that requests Jelly page 900. Consequently, Jelly expression 902 may be dynamic in the sense that each user visiting Jelly page 900 may see a different result of Jelly expression 902.

Jelly tag 904 may include functions and/or variables that can be called using Jelly engine 810. In some embodiments, Jelly tags may be configured to be an extension point. For example, Jelly tag 904 may take as input an extension point name ("Foo"), an id (via a Jelly expression), a description (via a Jelly expression), and a limit. These inputs may be passed to Jelly engine 810 and identified as elements of an extension point call. Then, Jelly engine 810 may request extension point service 802 for one or more implementations (up to the limit) of the extension point. These implementations may include UI macros that are rendered by Jelly engine 810 and inserted back into Jelly page 900 at the location of Jelly tag 904. In example embodiments, UI macros may refer to implementations of extension points that are written in Jelly.

Notably, the Jelly page depicted in FIG. 9 is just an example of how Jelly expressions and tags can be arranged. Other Jelly expressions, Jelly tags and arrangements are possible.

In some embodiments, Jelly may use a phase-based processing approach that allows Jelly engine 810 to render different sections of a Jelly page during different phases. Such a phase based approach may allow common Jelly features (e.g., headers, footers, menu items, etc.) to be rendered during a first phase and the results cached by the application. These cached results may be used across all users of the application. In a second phase, custom Jelly features (e.g., usernames, status reports, etc.) that are unique to individual users may be rendered and displayed for each individual user. Since common Jelly features might not change often, caching common Jelly features may save rendering time for Jelly engine 810.

Figure 10:
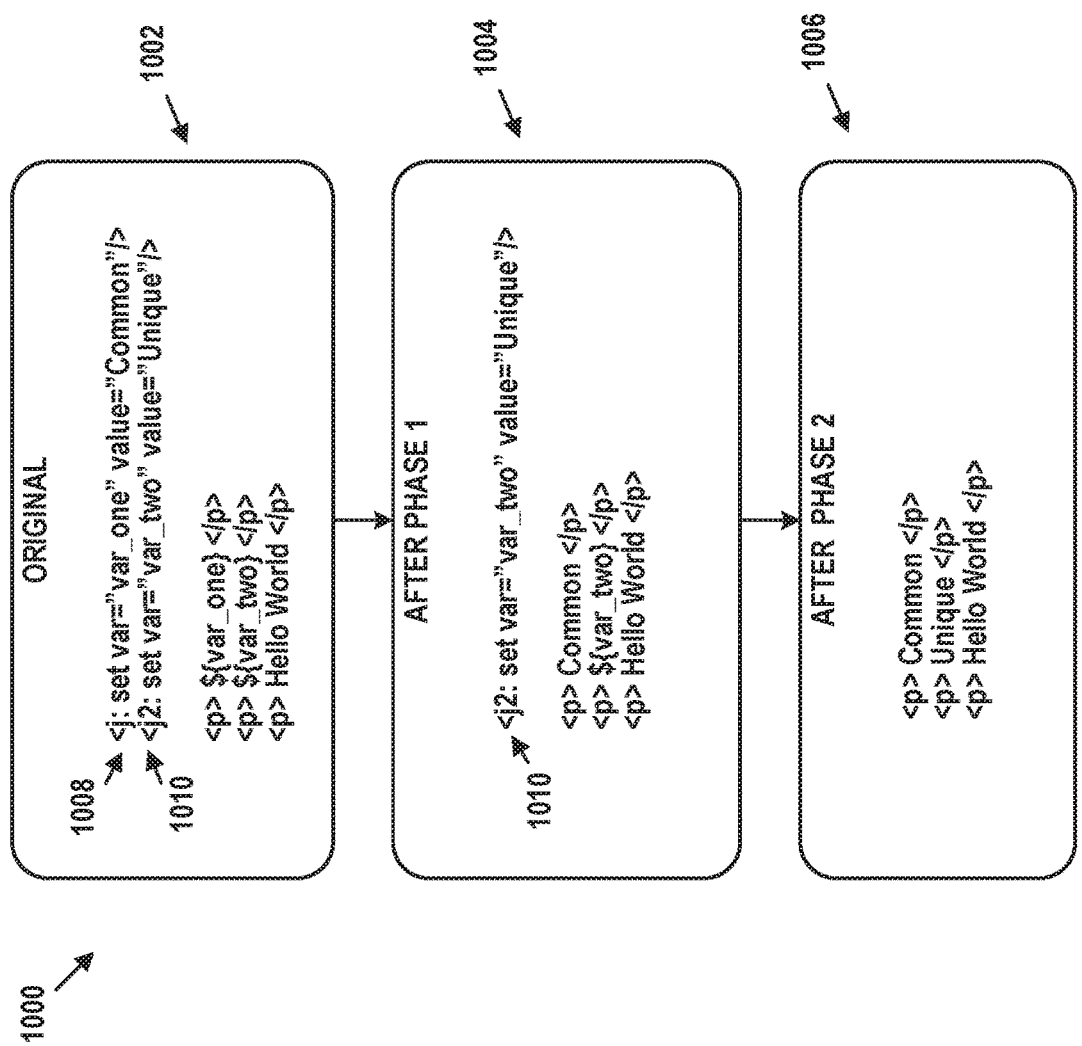
FIG. 10 depicts an example of a two phase Jelly process, in accordance with example embodiments.

FIG. 10 illustrates an example of a two phase Jelly rendering process 1000. Jelly rendering process 1000 may include an original Jelly page 1002, a second Jelly page 1004 (representing the original Jelly page after a first phase of processing), and a third Jelly page 1006 (representing the original Jelly page after phase a second phase of processing).

Original Jelly page 1002 may include a set of Jelly tags created by an application developer. These Jelly tags may contain information indicating the phase for which the content within the tags should be rendered. For example, original Jelly page 1002 may include <j> tag 1008 to indicate content that should be rendered during a first phase of processing, and <j2> tag 1010 to indicate content that should be rendered during a second phase of processing.

Second Jelly page 1004 may include the content of original jelly page 1002 after a first phase of processing by Jelly engine 810. For example, the content corresponding to <j> tag 1008 may be rendered and displayed on second Jelly page 1004. This rendered content may correspond to elements that are commonly shared across users of an application (e.g., headers, footers). In some cases, second Jelly page 1004 may be configured to re-render any time commonly shared elements are updated by an application developer (e.g., every few days or weeks). Re-rendering may allow second Jelly page 1004 to render the updates once and cache the results, thus saving rendering time for users that use these common elements. Conversely, content corresponding to <j2> tag 1010 from original Jelly page 1002 may still remain as a Jelly tag on second Jelly page 1004.

In some embodiments, the rendering of <j> tag 1008 on second Jelly page 1004 may in itself produce additional Jelly tags. For example, the value of <j> tag 1008 on original Jelly page 1002 may be embedded with a <j2> tag. Upon rendering <j> tag 1008 on second Jelly page 1004, the <j2> tag will be displayed on the page. This embedding of tags allows application developers to create multiple levels of customization. For instance, an application developer may want to create a <j> tag for a header, but may want a portion of the header to be customized to every user. Thus, the application developer may create the header as a <j> tag embedded with a <j2> that can be rendered with each user.

Third Jelly page 1006 may represent content that is rendered after a second phase of processing by Jelly engine 810. For example, the content corresponding to <j2> tag 1010 from original Jelly page 1002 may be rendered and displayed on third Jelly page 1006. This rendered content may correspond to elements that are unique to each user of an application (e.g., usernames, profile pictures).

Notably, the Jelly pages depicted in FIG. 10 are just examples of Jelly phases. In some cases, a Jelly page may have three phases. For instance, the first phase may render content used by a base page across all applications in an enterprise (e.g., a page containing headers or footers). The second phase may render content specific for a department (i.e. a banner containing the department name). The third phase may render content specific to individual users. Other possibilities for Jelly phases exist.

D. Example Extension Point Procedures

Figure 11:
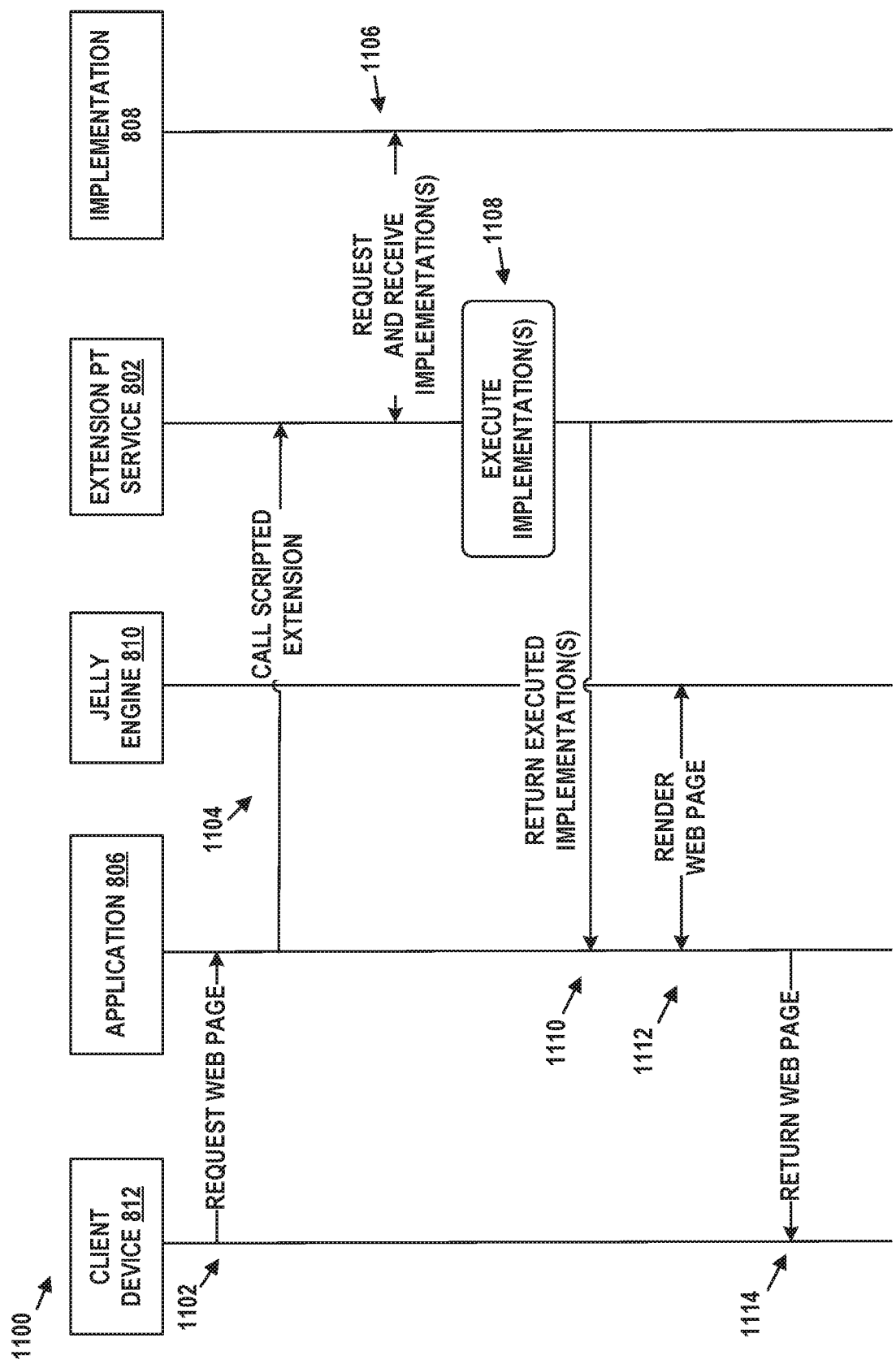
FIG. 11 illustrates using a server-side extension point, in accordance with example embodiments.
Figure 12:
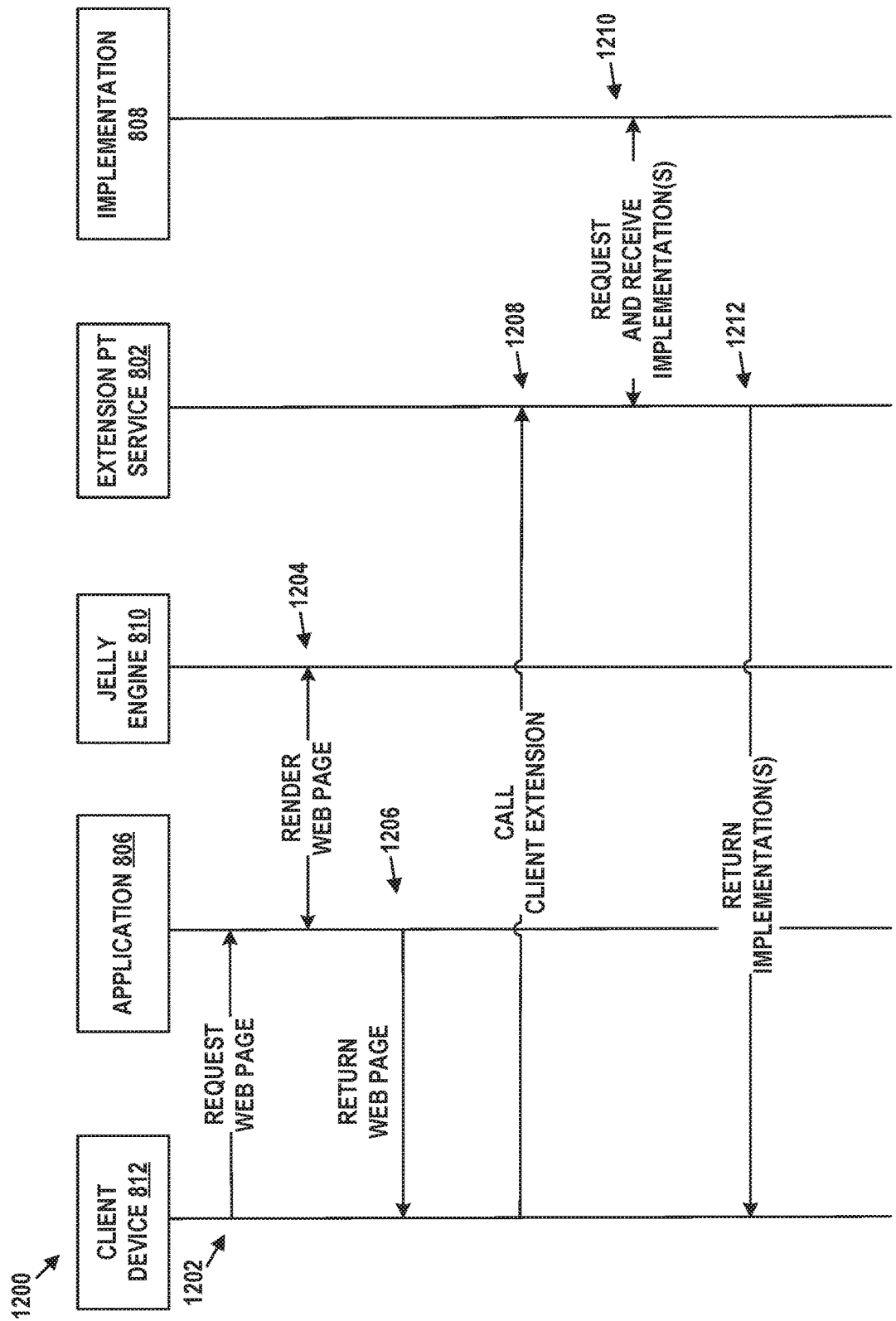
FIG. 12 illustrates using a client-side extension point, in accordance with example embodiments.
Figure 13:
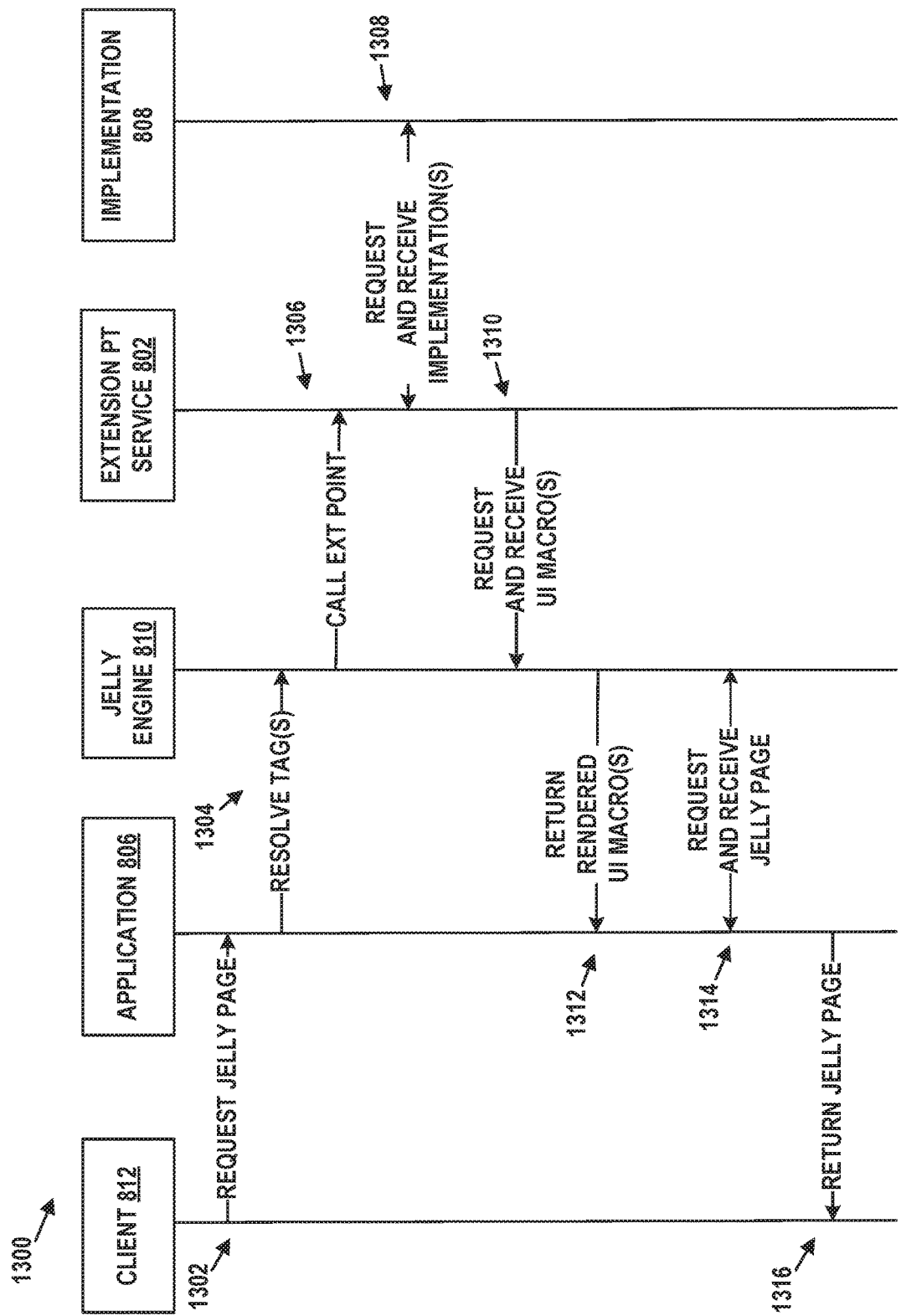
FIG. 13 illustrates using an extension point by way of Jelly, in accordance with example embodiments.

FIGS. 11-13 illustrate example procedures using extension point system of FIG. 8. These procedures utilize client device 812, application 806, Jelly engine 810, extension point service 802, and implementation database 808 to provide custom functionality via scripted extension points, client extension points, and UI extension points.

While FIGS. 11-13 may rely on Jelly for application 806 and Jelly engine 810 during operation, in some embodiments, alternative rendering engines may be used. As an example, a mixture of HTML and client-side JavaScript used with the ANGULAR® framework may be used to render responsive web pages. As another example, a custom JavaScript framework may be used. Similar to Jelly, these alternative rendering engines may be configured to programmatically return static HTML blocks and/or JavaScript to web browsers and may be configured to execute functionality server-side to mutate outputs before sending to clients.

FIG. 11 depicts example scripted extension point procedure 1100. Scripted extension point procedure 1100 may be utilized by extension points with implementations that are executed on a server device using scripts (or any other form of executable code). Such extension points may be referred to as server extension points and implementations of these extension points may be referred to as server-side scripts. Server-side scripts may be written in, for example, JavaScript, Python, or other server-side languages.

At step 1102, client device 812 requests web-based content (e.g., a web page) from application 806. This request may be an HTTP request via a web browser on client device 812 to a web server hosting application 806. The web-based content requested may include application code written in Jelly that may be rendered into HTML for display on client device 812.

At step 1104, application 806 requests extension point service 802 for the executed implementations (i.e., the results from executing one or more scripts that implement the extension point) of one or more server extension points. This request may originate from one or more server extension points embedded into the base code of application 806. Extension point service 802 may receive this request via REST API 804 and relay the request to scripted extension 804A for retrieving and executing any implementation(s). At step 1106, extension point service 802 (via scripted extension 804A) retrieves the requested implementations from implementation database 808.

At step 1108, extension point service 802 executes (via scripted extension 804A) the retrieved implementations and obtains the result. In some embodiments, extension point service 802 may sequentially execute a list of one or more returned implementations to mutate an input. For example, extension point service 802 may sequentially execute a list containing two implementations, where the output of the first implementation becomes the input of the second implementation. At step 1110, extension point service 802 returns the result of the executed implementation(s) back to application 806. Application 806 may use the returned result to decide on any subsequent actions.

At step 1112, application 806 requests any Jelly elements in the requested web-based content to be rendered by Jelly engine 810. If there are no Jelly elements to resolve, no requests will be made. At step 1114, application 806 returns the rendered web-based content back to client device 812.

FIG. 12 depicts example client extension point procedure 1200. Client extension point procedure 1200 may be utilized by extension points with implementations that execute directly on a client device 812 using scripts. Such extension points may be referred to as client extension points and implementations of these extension points may be referred to as client-side scripts. For example, client-side scripts may include JavaScript or other client-side languages.

At step 1202, client device 812 requests web-based content (e.g., a web page) from application 806. This request may be an HTTP request via a web browser on client device 812 to a web server hosting application 806. The web-based content requested may include application code written in Jelly that may be rendered into HTML for display on client device 812.

At step 1204, application 806 requests any Jelly elements in the requested web-based content to be rendered by Jelly engine 810. This web-based content may include references (i.e. via <script> tags) to client files (e.g., JavaScript files) embedded with one or more client extension points. At step 1206, application 806 returns the rendered web-based content back to client device 812 for execution thereon.

At step 1208, client 812 may trigger the client extension point to request extension point service 802 for the implementations of one or more client extension points. This trigger may originate from a click of a button on web-based content or similar user action. Extension point service 802 may receive this request via REST API 804 and relay the request to scripted extension 804A for retrieving the implementation(s). At step 1210, extension point service 802 (via scripted extension 804A) retrieves the requested implementation(s) from implementation database 808.

At step 1212, extension point service 802 (via scripted extension 804A) returns the implementation(s) back to client device 812. In some embodiments, client 812 may sequentially execute a list of returned implementations to mutate an input. For example, client 812 may sequentially execute a list containing two implementations, where the output of the first implementation becomes the input of the second implementation.

Notably, client extension point procedure 1200 may be configured to return all implementations of the client extension point (e.g., JavaScript files) to client device 812 in a single response. This differs from typical client-server architectures, in which a client makes separate requests for individual scripts and receives separate responses to each request. With client extension point procedure 1200, all client side scripts may be requested with a single API request and returned to a client with a single API response, reducing response time latency.

FIG. 13 depicts an example UI extension point procedure 1300. UI extension point procedure 1300 may be utilized by extension points implemented via Jelly. Such extension points may be referred to as UI extension points and implementations of these extension points may be referred to as UI macros. Whereas server extension points or client extensions points may rely on executable implementations, UI macros may be configured to return static content blocks, for example, HTML. Alternatively, in some embodiments, UI macros may be configured to execute on extension point service 802 and may not return any static content blocks. For example, a UI macro may execute on the server to manipulate data and make calls out to other services, while not returning any content.

At step 1302, client device 812 requests web-based content (e.g., a Jelly page) from application 806. This request may be an HTTP request via a web browser on client device 812 to a web server hosting application 806. The web-based content requested may include application code written in Jelly that may be rendered into HTML for display on client device 812.

At step 1304, application 806 determines the specific Jelly page requested. During this determination, application 806 may be configured to identify that the Jelly page requested contains one or more UI extension points. For example, UI extension points may be configured as Jelly tags on the requested Jelly page. Upon detecting UI extension points, application 806 may request Jelly engine 810 to resolve the UI extension point tags.

At step 1306, Jelly engine 810 receives the resolution request from application 806. This request may include one or more input parameters, such as the name of the UI extension point and variables passed to the UI extension point. Jelly engine 810 may then request extension point service 802 for the implementations of one or more UI extension points. Extension point service 802 may receive this request via REST API 804 and relay the request to UI extension 804B for retrieving the implementation(s). At step 1308, extension point service 802 (via UI extension 804B) retrieves the requested implementation(s) from implementation database 808.

At step 1310, extension point service 802 (via UI extension 804B) provides the implementation(s) to Jelly engine 810. These implementation(s) may be UI macros. At step 1112, Jelly engine 810 renders the implementation(s) and returns the rendered implementation(s) (one or more UI macros) to application 806 (via UI extension 804B). Application 806 may insert rendered implementation(s) (e.g., static HTML) into the Jelly page requested by client 812.

At step 1314, application 806 requests the entire Jelly page to be rendered and returned by Jelly engine 810. As noted above, the Jelly engine 810 may include multiple rendering phases for different Jelly elements on the Jelly page. For example, a first rendering phase may be used to render content used across all users of application 806 (e.g., a page containing headers or footers). This content may be rendered once (e.g., the first time a user of application 806 requests the Jelly page) and cached by application 806 for quick access. A second phase may then be used to render content specific for a user (e.g., a banner containing the username).

At step 1316, the rendered Jelly page is returned by application 806 to client device 812 (typically via a browser). In some embodiments, UI macros may contain scripts tags (e.g., <script> written in HTML) that specify the location of a source script on application 806. In this case, client device 812 would make a secondary request to obtain these scripts from application 806.

Notably, UI extension point procedure 1300 is just an example of how UI extension points may be used. In some embodiments, UI extension points embedded into scripts on application 806. For example, a UI extension point on application 806 may take as input the name of a UI extension point and may request extension point service 802 for the implementations. In response, extension point service 802 may return one or more rendered UI macros (i.e. static content) to application 806. This UI macro may subsequently be inserted into web-based content by application 806 and delivered to client device 812.

In some embodiments, UI extension point may be embedded into client scripts running on client device 812. For example, an application developer may place a UI extension point in a client file that is sent to client device 812 via application 806. Upon execution of the client file, client device 812 may utilize the UI extension point to request extension point service 802 for a UI extension point. In response, extension point service 802 may return one or more rendered UI macros (e.g., static content) to client device 812. This UI macro may be directly displayed to client device 812 (e.g., via a web browser).

VI. Example Operations

Figure 14:
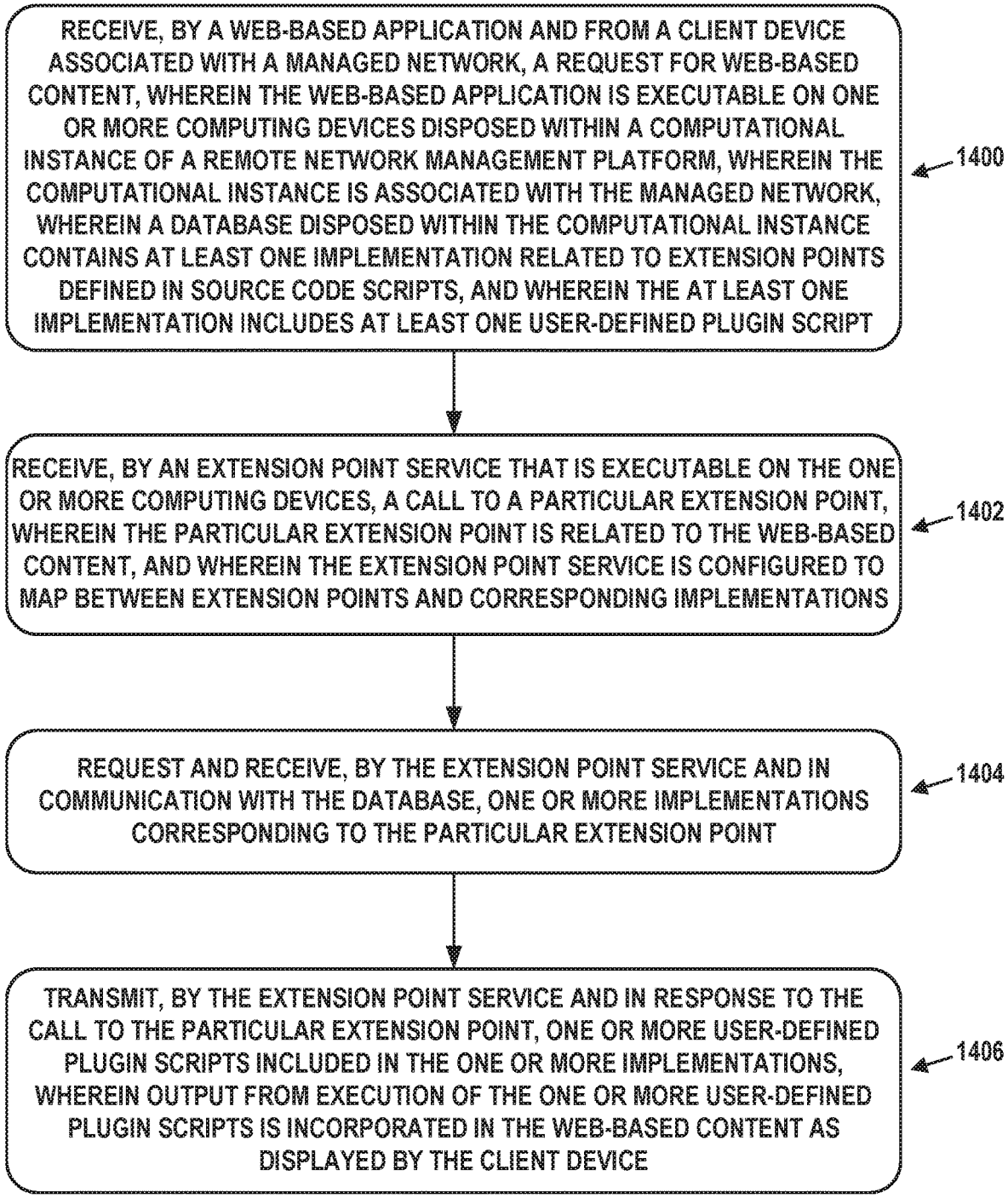
FIG. 14 is a flow chart, in accordance with example embodiments.

FIG. 14 is a flow chart illustrating an example embodiment. The process illustrated by FIG. 14 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 14 may be simplified by the removal of any one or more of the features shown therein. Further, these embodiments may be combined with features, aspects, and/or implementations of any of the previous figures or otherwise described herein.

Block 1400 of FIG. 14 may involve receiving, by a web-based application and from a client device associated with a managed network, a request for web-based content. The web-based application may be executable on one or more computing devices disposed within a computational instance of a remote network management platform, where the computational instance is associated with the managed network. A database disposed within the computational instance may contain at least one implementation related to extension points defined in source code scripts, and the at least one implementation may include at least one user-defined plugin script.

Block 1402 may involve receiving, by an extension point service that is executable on the one or more computing devices, a call to a particular extension point. The particular extension point may be related to the web-based content, and the extension point service may be configured to map between extension points and corresponding implementations.

Block 1404 may involve requesting and receiving, by the extension point service and in communication with the database, one or more implementations corresponding to the particular extension point.

Block 1406 may involve transmitting, by the extension point service and in response to the call to the particular extension point, one or more user-defined plugin scripts included in the one or more implementations. Output from execution of the one or more user-defined plugin scripts may be incorporated in the web-based content as displayed by the client device.

In some embodiments, the web-based application transmits the call to the particular extension point, the extension point service executes the one or more user-defined plugin scripts, and the extension point service transmits results from execution of the one or more user-defined plugin scripts to the web-based application.

In some embodiments, a rendering engine (e.g., a Jelly engine) is configured to convert XML-based script directives (e.g., Jelly code) into markup language. The rendering engine may be executable on the one or more computing devices, and one or more of the results may contain at least one convertible XML-based script directive. The embodiments may further involve: (i) transmitting, by the web-based application and to the rendering engine, the one or more of the results; (ii) converting, by the rendering engine, the at least one convertible XML-based script directive into elements of the markup language; and (iii) transmitting, by the rendering engine and to the web-based application, the elements of the markup language. These elements may be XML elements, HTML elements, or scripts (e.g., JavaScript).

The embodiments may also involve transmitting, by the web-based application and to the client device, a rendered version of the web-based content including the elements of the markup language.

Additional or alternative embodiments may involve: (i) rendering the web-based content; and (ii) transmitting, by the web-based application and to the client device, the web-based content as rendered, where the client device transmits the call to the particular extension point, and where the extension point service transmits the one or more user-defined plugin scripts to the client device.

These embodiments may also involve a rendering engine (e.g., a Jelly engine) configured to convert XML-based script directives (e.g., Jelly code) into markup language. The rendering engine may be executable on the one or more computing devices, and the web-based content prior to rendering may contain at least one convertible XML-based script directive. The embodiments may further involve converting, by the rendering engine, the at least one convertible XML-based script directive into elements of the markup language, where the web-based content as rendered includes the elements of the markup language. These elements may be XML elements, HTML elements, or scripts (e.g., JavaScript).

Additional or alternative embodiments may involve a rendering engine (e.g., a Jelly engine) configured to convert WL-based script directives (e.g., Jelly code) into markup language. The rendering engine may be executable on the one or more computing devices. These embodiments may involve transmitting, by the web-based application and to the rendering engine, a further request to convert at least one convertible XML-based script directive. The at least one convertible XML-based script directive may invoke the particular extension point, the rendering engine may transmit the call to the particular extension point, the rendering engine may receive the one or more user-defined plugin scripts, and the rendering engine may transmits the one or more user-defined plugin scripts to the web-based application.

In these embodiments, the one or more user-defined plugin scripts, when rendered, may contain at least one further convertible XML-based script directive. The embodiments may further involve: (i) transmitting, by the web-based application and to the rendering engine, an additional request to convert the at least one further convertible XML-based script directive; (ii) converting, by the rendering engine, the at least one convertible XML-based script directive into elements of the markup language; (iii) transmitting, by the rendering engine and to the web-based application, the elements of the markup language; and (iv) transmitting, by the rendering engine and to the client device, the web-based content including the elements of the markup language.

In some embodiments, there is a one-to-many relationship between the extension points and the corresponding implementations, and the call to the particular extension point results in execution of all of the one or more user-defined plugin scripts.

In some embodiments, there is a one-to-many relationship between the extension points and the corresponding implementations, the call to the particular extension point specifies an amount, the call to the particular extension point results in only the amount of the one or more user-defined plugin scripts being executed, the one or more user-defined plugin scripts are executed as indicated by an ordering of the one or more implementations, and/or the ordering is defined in the extension point service.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising a first processor and a first memory, accessible by the first processor and storing instructions that, when executed by the first processor, cause the first processor to execute a computational instance, the computational instance associated with a managed network and the computational instance comprising:
a database containing at least one implementation related to extension points defined in source code scripts, wherein the at least one implementation includes at least one user-defined plugin script;
an extension point service that is executable on one or more computing devices disposed within the computational instance, wherein the extension point service is configured to map between extension points and corresponding implementations;
a web-based application that is executable on the one or more computing devices, wherein execution of the web-based application involves invocation of at least one of the extension points; and
wherein at least one of the one or more computing devices comprises:
a second processor; and
a second memory storing instructions, that when executed by the second processor, cause the second processor to:
receive, via a user interface, a set of configuration information associated with a particular extension point, wherein the user interface comprises a set of input fields,
receive, by the web-based application and from a client device associated with the managed network, a request for web-based content,
receive, by the extension point service, a call to the particular extension point, wherein the particular extension point is related to the web-based content, wherein the call to the particular extension point specifies a particular number, and wherein the call to the particular extension point results in only the particular number of one or more user-defined plugin scripts being executed,
request and receive, by the extension point service and in communication with the database, one or more implementations corresponding to the particular extension point, and
transmit, by the extension point service and in response to the call to the particular extension point, the particular number of the one or more user-defined plugin scripts included in the one or more implementations, wherein output from execution of the particular number of the one or more user-defined plugin scripts is incorporated in the web-based content as displayed by the client device.

2. The system of claim 1, wherein the web-based application transmits the call to the particular extension point, wherein the extension point service executes the one or more user-defined plugin scripts, wherein the extension point service transmits results from execution of the one or more user-defined plugin scripts to the web-based application.

3. The system of claim 2, comprising:
a rendering engine configured to convert XML-based script directives into a markup language, wherein one or more of the results contain at least one convertible XML-based script directive, and wherein the instructions cause the second processor to:
transmit, by the web-based application and to the rendering engine, the one or more of the results;
convert, by the rendering engine, the at least one convertible XML-based script directive into elements of the markup language; and
transmit, by the rendering engine and to the web-based application, the elements of the markup language.

4. The system of claim 3, wherein the instructions cause the second processor to:
transmit, by the web-based application and to the client device, a rendered version of the web-based content including the elements of the markup language.

5. The system of claim 1, wherein the instructions cause the second processor to:
render the web-based content; and
transmit, by the web-based application and to the client device, the web-based content as rendered, wherein the client device transmits the call to the particular extension point, and wherein the extension point service transmits the one or more user-defined plugin scripts to the client device.

6. The system of claim 5, comprising:
a rendering engine configured to convert XML-based script directives into a markup language, wherein the web-based content prior to rendering contains at least one convertible XML-based script directive, wherein the instructions cause the second processor to:
convert, by the rendering engine, the at least one convertible XML-based script directive into elements of the markup language, wherein the web-based content as rendered includes the elements of the markup language.

7. The system of claim 1, wherein there is a one-to-many relationship between the extension points and the corresponding implementations, and wherein the call to the particular extension point results in execution of all of the one or more user-defined plugin scripts.

8. The system of claim 1, wherein there is a one-to-many relationship between the extension points and the corresponding implementations, wherein the one or more user-defined plugin scripts are executed as indicated by an ordering of the one or more implementations, and wherein the ordering is defined in the extension point service.

9. A system comprising a first processor and a first memory, accessible by the first processor and storing instructions that, when executed by the first processor, cause the first processor to execute a computational instance, the computational instance associated with a managed network and the computational instance comprising:
a database containing at least one implementation related to extension points defined in source code scripts, wherein the at least one implementation includes at least one user-defined plugin script;
an extension point service that is executable on one or more computing devices disposed within the computational instance, wherein the extension point service is configured to map between extension points and corresponding implementations;
a web-based application that is executable on the one or more computing devices, wherein execution of the web-based application involves invocation of at least one of the extension points; and
wherein at least one of the one or more computing devices comprises:
a second processor; and
a second memory storing instructions, that when executed by the second processor, cause the second processor to:
receive, via a user interface, a set of configuration information associated with a particular extension point, wherein the user interface comprises a set of input fields,
receive, by the web-based application and from a client device associated with the managed network, a request for web-based content,
receive, by the extension point service, a call to the particular extension point, wherein the particular extension point is related to the web-based content,
request and receive, by the extension point service and in communication with the database, one or more implementations corresponding to the particular extension point, and
transmit, by the extension point service and in response to the call to the particular extension point, one or more user-defined plugin scripts included in the one or more implementations, wherein output from execution of the one or more user-defined plugin scripts is incorporated in the web-based content as displayed by the client device; and
a rendering engine configured to convert XML-based script directives into a markup language, wherein the instructions cause the second processor to:
transmit, by the web-based application and to the rendering engine, a further request to convert at least one convertible XML-based script directive, wherein the at least one convertible XML-based script directive invokes the particular extension point, wherein the rendering engine transmits the call to the particular extension point, wherein the rendering engine receives the one or more user-defined plugin scripts, and wherein the rendering engine transmits the one or more user-defined plugin scripts to the web-based application.

10. The system of claim 9, wherein the one or more user-defined plugin scripts, when rendered, contain at least one further convertible XML-based script directive, and wherein the instructions cause the second processor to:
transmit, by the web-based application and to the rendering engine, an additional request to convert the at least one further convertible XML-based script directive;
convert, by the rendering engine, the at least one convertible XML-based script directive into elements of the markup language;
transmit, by the rendering engine and to the web-based application, the elements of the markup language; and
transmit, by the rendering engine and to the client device, the web-based content including the elements of the markup language.

11. A computer-implemented method comprising:
receiving, by a web-based application and from a client device associated with a managed network, a request for web-based content, wherein the web-based application is executable on one or more computing devices disposed within a computational instance of a remote network management platform, wherein the computational instance is associated with the managed network, wherein a database disposed within the computational instance contains at least one implementation related to extension points defined in source code scripts, and wherein the at least one implementation includes at least one user-defined plugin script;
receive, via a user interface, a set of configuration information associated with a particular extension point, wherein the user interface comprises a set of input fields;
receiving, by an extension point service that is executable on the one or more computing devices, a call to the particular extension point, wherein the particular extension point is related to the web-based content, wherein the extension point service is configured to map between extension points and corresponding implementations, wherein the call to the particular extension point specifies a particular number, and wherein the call to the particular extension point results in only the particular number of one or more user-defined plugin scripts being executed;

requesting and receiving, by the extension point service and in communication with the database, one or more implementations corresponding to the particular extension point; and transmitting, by the extension point service and in response to the call to the particular extension point, the particular number of the one or more user-defined plugin scripts included in the one or more implementations, wherein output from execution of the particular number of the one or more user-defined plugin scripts is incorporated in the web-based content as displayed by the client device.

12. The computer-implemented method of claim 11, wherein the web-based application transmits the call to the particular extension point, wherein the extension point service executes the one or more user-defined plugin scripts, and wherein the extension point service transmits results from execution of the one or more user-defined plugin scripts to the web-based application.

13. The computer-implemented method of claim 12, wherein a rendering engine configured to convert XML-based script directives into a markup language, wherein the rendering engine is executable on the one or more computing devices, and wherein one or more of the results contain at least one convertible XML-based script directive, the method comprising:

transmitting, by the web-based application and to the rendering engine, the one or more of the results;

converting, by the rendering engine, the at least one convertible XML-based script directive into elements of the markup language; and transmitting, by the rendering engine and to the web-based application, the elements of the markup language.

14. The computer-implemented method of claim 13, comprising:

transmitting, by the web-based application and to the client device, a rendered version of the web-based content including the elements of the markup language.

15. The computer-implemented method of claim 11, comprising:

rendering the web-based content; and transmitting, by the web-based application and to the client device, the web-based content as rendered, wherein the client device transmits the call to the particular extension point, and wherein the extension point service transmits the one or more user-defined plugin scripts to the client device.

16. The computer-implemented method of claim 15, wherein a rendering engine configured to convert XML-based script directives into a markup language is executable on the one or more computing devices, wherein the web-based content prior to rendering contains at least one convertible XML-based script directive, the method comprising:

converting, by the rendering engine, the at least one convertible XML-based script directive into elements of the markup language, wherein the web-based content as rendered includes the elements of the markup language.

17. The computer-implemented method of claim 11, wherein there is a one-to-many relationship between the extension points and the corresponding implementations, wherein the one or more user-defined plugin scripts are executed as indicated by an ordering of the one or more implementations, and wherein the ordering is defined in the extension point service.

18. A computer-implemented method comprising:

receiving, by a web-based application and from a client device associated with a managed network, a request for web-based content, wherein the web-based application is executable on one or more computing devices disposed within a computational instance of a remote network management platform, wherein the computational instance is associated with the managed network, wherein a database disposed within the computational instance contains at least one implementation related to extension points defined in source code scripts, and wherein the at least one implementation includes at least one user-defined plugin script;

receive, via a user interface, a set of configuration information associated with a particular extension point, wherein the user interface comprises a set of input fields;

receiving, by an extension point service that is executable on the one or more computing devices, a call to the particular extension point, wherein the particular extension point is related to the web-based content, and wherein the extension point service is configured to map between extension points and corresponding implementations;

requesting and receiving, by the extension point service and in communication with the database, one or more implementations corresponding to the particular extension point; and transmitting, by the extension point service and in response to the call to the particular extension point, one or more user-defined plugin scripts included in the one or more implementations, wherein output from execution of the one or more user-defined plugin scripts is incorporated in the web-based content as displayed by the client device, wherein a rendering engine configured to convert XML-based script directives into a markup language is executable on the one or more computing devices; and transmitting, by the web-based application and to the rendering engine, a further request to convert at least one convertible XML-based script directive, wherein the at least one convertible XML-based script directive invokes the particular extension point, wherein the rendering engine transmits the call to the particular extension point, wherein the rendering engine receives the one or more user-defined plugin scripts, and wherein the rendering engine transmits the one or more user-defined plugin scripts to the web-based application.

19. The computer-implemented method of claim 18, wherein the one or more user-defined plugin scripts, when rendered, contain at least one further convertible XML-based script directive, the method comprising:

transmitting, by the web-based application and to the rendering engine, an additional request to convert the at least one further convertible XML-based script directive;

converting, by the rendering engine, the at least one convertible XML-based script directive into elements of the markup language;

transmitting, by the rendering engine and to the web-based application, the elements of the markup language; and transmitting, by the rendering engine and to the client device, the web-based content including the elements of the markup language.

20. An article of manufacture including a non-transitory computer-readable medium, having stored thereon program instructions that, upon execution by one or more computing devices disposed within a computational instance of a remote network management platform, cause the one or more computing devices to perform operations comprising:

receiving, by a web-based application and from a client device associated with a managed network, a request for web-based content, wherein the web-based application is executable on the one or more computing devices, wherein the computational instance is associated with the managed network, wherein a database disposed within the computational instance contains at least one implementation related to extension points defined in source code scripts, and wherein the at least one implementation includes at least one user-defined plugin script;

receive, via a user interface, a set of configuration information associated with a particular extension point, wherein the user interface comprises a set of input fields;

receiving, by an extension point service that is executable on the one or more computing devices, a call to the particular extension point, wherein the particular extension point is related to the web-based content, wherein the extension point service is configured to map between extension points and corresponding implementations, wherein the call to the particular extension point specifies a particular number, and wherein the call to the particular extension point results in only the particular number of one or more user-defined plugin scripts being executed;

requesting and receiving, by the extension point service and in communication with the database, one or more implementations corresponding to the particular extension point; and transmitting, by the extension point service and in response to the call to the particular extension point, the particular number of the one or more user-defined plugin scripts included in the one or more implementations, wherein output from execution of the particular number of the one or more user-defined plugin scripts is incorporated in the web-based content as displayed by the client device.

* * * * *